United States Patent [19]

Siegwart, Jr.

[11] Patent Number: 4,790,554

[45] Date of Patent: Dec. 13, 1988

[54] PULLEY SHIFT ASSEMBLY

[75] Inventor: John T. Siegwart, Jr., Birmingham, Ala.

[73] Assignee: Research Corporation, New York, N.Y.

[21] Appl. No.: 934,276

[22] Filed: Nov. 24, 1986

[51] Int. Cl.$^4$ .............................................. B62M 9/14
[52] U.S. Cl. ..................................... 280/236; 474/78; 474/80
[58] Field of Search .................. 280/236, 238; 474/78, 474/79, 80

[56] References Cited

U.S. PATENT DOCUMENTS 4,127,038  11/1978  Browning ....................... 474/160 X
4,580,997   4/1986  Browning ............................. 474/78
4,592,738   6/1986  Nagano ................................ 474/80

FOREIGN PATENT DOCUMENTS 2551418  3/1985  France .
617992   6/1980  Switzerland ....................... 280/236
411360   6/1934  United Kingdom .

Primary Examiner—John A. Pekar
Attorney, Agent, or Firm—Scully, Scott, Murphy & Presser

[57] ABSTRACT

An assembly comprising a pulley sub assembly and a shift sub assembly. The pulley sub assembly includes a plurality of pulleys, each pulley includes a plurality of sections, and at least one section of each pulley is axially moveable. The shift sub assembly has a disengaged position to maintain the pulleys in normal positions, and an engaged position. With one embodiment, when the shift sub-assembly is in the engaged position, it slides a section of a first pulley from the plane thereof, into the plane of a second pulley, and then back into the plane of the first pulley. With an alternate embodiment, when the first sub-assembly is in the engaged position, it slides all of the sections of a pulley, one at a time, into the plane of another pulley.

33 Claims, 10 Drawing Sheets

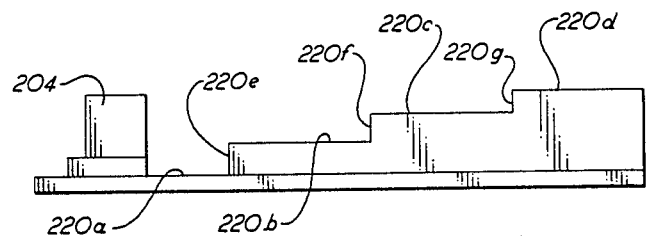
FIG. 12
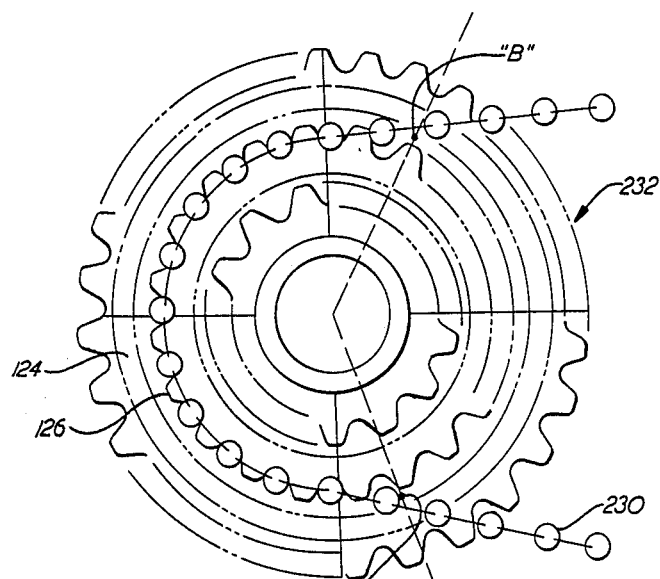
FIG. 13
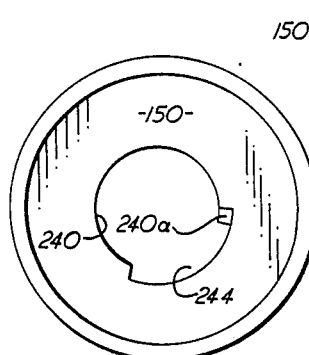 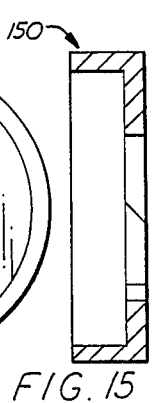 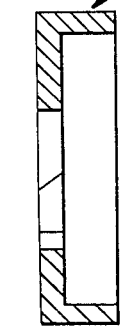 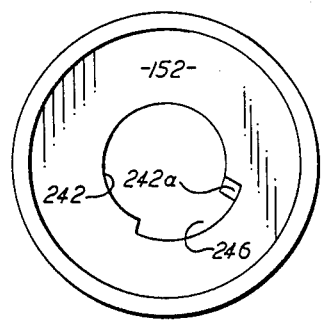
FIG. 14    FIG. 15    FIG. 17    FIG. 16

PULLEY SHIFT ASSEMBLY

BACKGROUND OF THE INVENTION

This invention generally relates to mechanisms for transferring force through a pulley and belt, or a chain and sprocket, and more particularly to such mechanisms, for example in the pedaling arrangements of bicycles or the like, wherein drive ratios are changed by moving the belt or chain between pulleys or sprockets of different diameters during rotation of the pulleys or sprockets.

The advantages of and need for variable speed pulley and belt, or chain and sprocket assemblies has long been recognized. U.S. Pat. Nos. 3,448,628 and 3,583,249 show deraileur mechanisms of the type commonly found on bicycles for the purpose of shifting a driving chain of a pedaling system from sprocket to sprocket in a cluster of sprockets having different diameters, for example. Other devices, such as those shown in U.S. Pat. Nos. 3,798,989, 3,861,277 and 3,800,613 show mechanisms wherein the effective diameter of a compound sprocket is varied to achieve different speed ratios.

While these previously known devices may be satisfactory for many purposes, it is believed that they may be improved upon in several respects. For example, a derailuer mechanism does not always shift a chain precisely, and this frequently results in over or under shifting and a need to adjust the shift levers after a shift has nominally been completed. Also, to shift a chain with a deraileur mechanism, the chain is pushed off one sprocket and onto another, which can cause a momentary loss of power to the rear wheel of the bicycle, and can cause the chain to slip when the chain tension is high, such as when the bicycle is being ridden up a hill.

U.S. Pat. No. 4,127,038 discloses a sprocket cluster that is pivoted to shift a chain from one sprocket to another while maintaining a positive drive relationship between the chain and the sprockets. As a practical matter, this pivoting movement tends to place a relatively low limit on the number of sprockets that the cluster can include.

SUMMARY OF THE INVENTION

An object of this invention is to provide a pulley or sprocket shift assembly wherein a belt or chain can be moved from one pulley or sprocket to another without losing a positive drive connection during such shifting.

Another object of the present invention is to provide means to slide at least a first section of a first pulley axially into the plane of a second pulley, and then back into the plane of the first pulley, to shift a drive chain to that first pulley from the second pulley.

It is an object of the present invention to provide a variable ratio sprocket assembly for a bicycle having a plurality of sprockets, each with a different diameter (or ratio) on a single hub. The sprocket assembly is divided into four radial sections, three of which are shiftable axially with respect to the axis of rotation of the hub, and a plane defined by the drive chain. All of the sprocket sections in a radial section slide together as a single unit when the radial section is shifted axially. When a change in ratio is desired, the radial section of the sprocket assembly *not* in engagement with the chain, is shifted axially to move a different diameter sprocket section into the plane of the drive chain. As the hub continues to rotate, the shifted sprocket section, and the desired ratio, engages the chain. The next two immediately following sprocket sections are shifted as soon as they are no longer in engagement with the chain. When three of the sprocket sections with the desired ratio are in engagement with the chain, those three sections, and the chain, are shifted axially together to their original axial alignment to thereby align all four sections of the sprocket in a single axial plane.

A further object of this invention is to provide means to slide each of a plurality of sections of a first pulley, one at a time, into the plane of a second pulley to shift a belt or chain from that second pulley to the first pulley.

Another object of this invention is to provide a sprocket assembly having a plurality of different diameter sprockets, especially well suited for use in a pedaling arrangement of a bicycle, that will maintain a positive drive connection between a driving chain and the sprocket assembly as the chain is shifted from one sprocket to another sprocket of the sprocket assembly.

These and other objectives are attained with a pulley shift assembly comprising an axle, a pulley sub assembly, a shift sub assembly, and actuator means. The pulley sub assembly includes a plurality of pulleys rotatably mounted on the axle, and each pulley includes a plurality of sections. At least a first section of each pulley is axially moveable relative to a second section of the pulley, and the pulleys have a normal position wherein all of the sections of each pulley are coplanar and the pulleys are axially spaced apart a preset distance. The shift sub assembly is located adjacent to the pulley sub assembly, and has a disengaged position for maintaining the pulleys in their normal position, and an engaged position to slide at least the first section of each pulley the preset distance along the axle. The actuator means is connected to the shift sub assembly to move that shift sub assembly from the disengaged position to the engaged position.

With a first embodiment, when the shift sub-assembly is in the engaged position, this sub-assembly is adapted to slide a first section of a first pulley from the plane thereof into the plane of a second, adjacent pulley, and then back into the plane of the first pulley. With a second embodiment, all of the sections of each pulley are axially moveable relative to the other sections of the pulley; and when the shift sub-assembly is in the engaged position, this sub-assembly slides all of the sections of a first pulley, one at a time, into the plane of a second, adjacent pulley.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 12 is a side view of the shift and return cams in their imaginary, developed position.

FIG. 13 is similar to FIG. 2, but also showing a chain mounted on the sprocket assembly.

FIGS. 14 and 15 are an end view and an axial cross-sectional view, respectively, of a shift initiation cam of the sprocket assembly of FIG. 1.

FIGS. 16 and 17 are an end view and an axial cross-sectional view, respectively, of another shift initiation cam of the sprocket assembly.

DETAILED DESCRIPTION OF THE PREFERRED EMBODIMENTS

Figure 1:
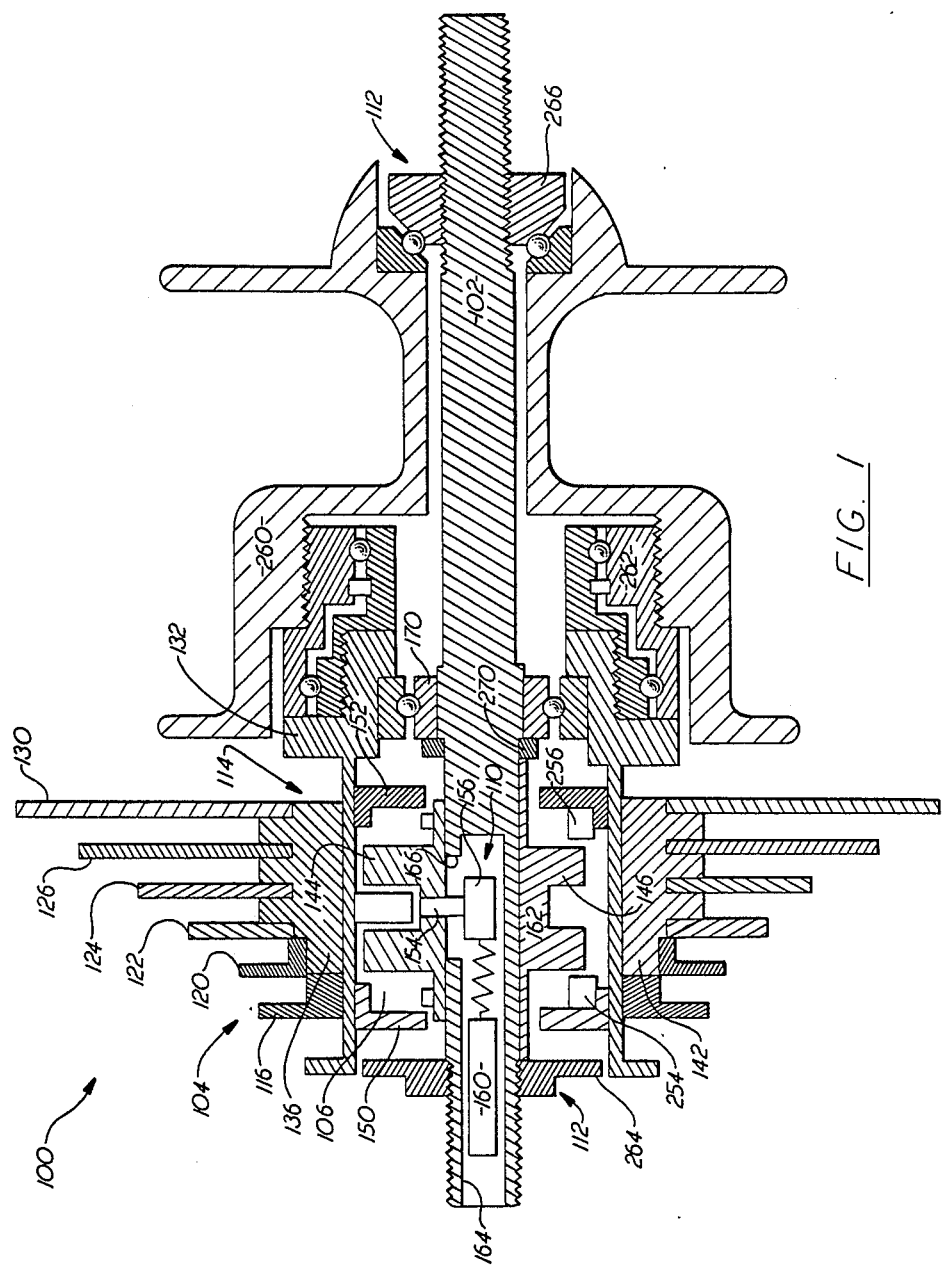
FIG. 1 is an axial cross-sectional view of a sprocket shift assembly according to the present invention.

Generally, the present invention is a pulley shift assembly including a plurality of pulleys that, in use, drive, or are driven by, a chain or belt mounted on a pulley of the assembly. The pulleys may be of various types and, for example, the pulleys may be wheels having smooth or grooved outside rims, or the pulleys may be wheels having toothed outside rims, commonly referred to as sprockets. As the terms are used herein, "pulley" is defined as including a sprocket and, conversely, a sprocket is considered to be a pulley. The embodiment of the invention shown in FIG. 1 is described as a sprocket shift assembly and includes various parts such as a sprocket sub-assembly, sprockets, and sprocket mounting sectors. It will be understood that, more generally, the apparatus shown in FIG. 1 is a pulley shift assembly; and that a sprocket sub-assembly is a pulley sub-assembly, sprockets are pulleys, and sprocket mounting sectors are pulley mounting sectors.

Figure 2:
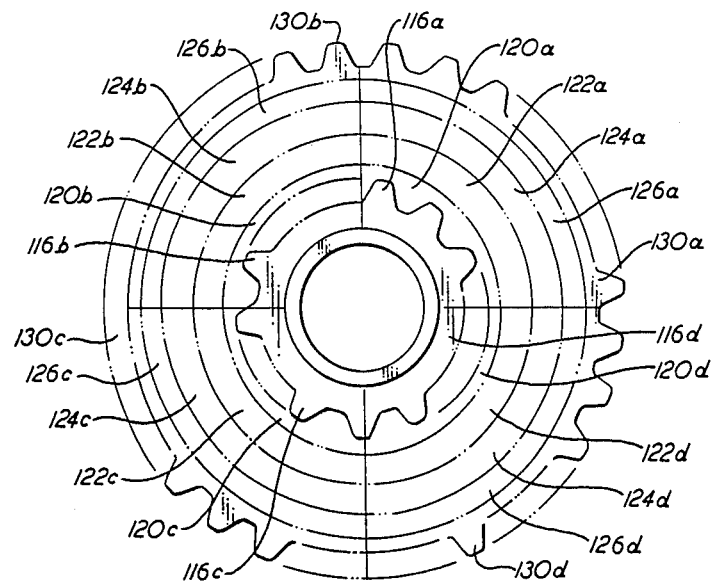
FIG. 2 is an end view of FIG. 1, particularly showing how each sprocket of the assembly of FIG. 1 is split into a plurality of sections.

FIG. 1 illustrates a sprocket shift assembly 100 generally comprising axle 102, sprocket sub assembly 104, shift sub assembly 106, actuator means 110, and retainer means 112. Sprocket sub assembly 104 includes mounting means 114 and a plurality of sprockets 116, 120, 122, 124, 126 and 130; and, as shown in FIG. 2, each of these sprockets includes a plurality of sprocket sections 116a-d, 120a-d, 122-d, 124a-d, 126a-d and 130a-d. Preferably, mounting means 114 includes drive hub 132 and a plurality of mounting sectors 134, 136, 140 and 142 (particularly shown in FIG. 5); shift sub assembly 106 includes shift cam 144, return cam 146, and shift initiation cams 150 and 152; and actuator means 110 includes connecting pin 154, base member 156, actuator rod 160, and actuator spring 162.

Axle 102 defines the axis of assembly 100, and has a generally solid cylindrical shape, although preferably the axle forms an end socket 164 and a radial opening 166 in communication with the end socket. Socket 164 and radial opening 166 are used in a manner discussed below, and preferably axle 102 also includes first and second threaded end sections.

Mounting means 114 of sprocket sub assembly 104 is mounted on axle 102 for rotation about the axis thereof; and, in particular, drive hub 132 encircles and is rotatable about the axle, and sprocket mounting sectors 134, 136, 140 and 142 are mounted on and connected to the drive hub for rotary movement therewith. Bearing 170 is located between axle 102 and drive hub 132 to hold that hub radially in place and to facilitate rotation of the drive hub around the axle.

Sprocket mounting sectors 134, 136 and 140 are supported for axial sliding movement along drive hub 132, while fourth sprocket mounting sector 142 is connected to the drive hub so that this sprocket mounting sector does not move axially relative to the drive hub. More specifically, with reference to FIGS. 1 and 3–7, drive hub 132 includes a cylindrical body 172 and a pair of spaced flanges 174 and 176 that radially extend outward from that cylindrical body. Sprocket mounting sectors 134, 136, 140 and 142 each have an arcuate shape and, in assembly, are located outside body 172, between flanges 174 and 176; and the sprocket mounting sectors may be radially slightly spaced from body 172, or the sprocket mounting sectors may be seated on that body.

Flange 174 defines six axial openings 174a-f, grouped together in three sets with each set including two different openings, and flange 176 defines six threaded openings (not shown) aligned with the openings 174a-f of flange 174. Sprocket mounting sector 134 defines a pair of axial through bores 134a and b, mounting sector 136 defines a pair of axial through bores 136a and b, and mounting sector 140 defines a pair of axial through bores 140a and b. In assembly, sprocket mounting sector 134 is positioned with openings 134a and b aligned, respectively, with openings 174a and b of flange 174 and with a pair of openings in drive hub flange 176. Similarly, mounting sector 136 is positioned with openings 136a and b aligned, respectively, with openings 174c and d of flange 174 and with a pair of openings in drive hub flange 176; and sprocket mounting sector 140 is located with openings 140a and b aligned, respectively, with openings 174e and f of flange 174 and with a pair of openings in flange 176.

Connecting rod 180a extends through openings 174a and 134a and is threaded into flange 176, and connecting rod 180b extends through openings 174b and 134b and is also threaded into flange 176. In a similar manner, connecting rod 180c extends through openings 174c and 136a, connecting rod 180d extends through openings 174d and 136b, connecting rod 180e extends through openings 174e and 140a, and connecting rod 180f extends through openings 174f and 140b; and each of the connecting rods 180c, d, e and f is threaded into flange 176. In this way, connecting rods 180a-f connect mounting sectors 134, 136 and 140 to drive hub 132 for rotary movement therewith while allowing and guiding axial movement of these mounting sectors along the drive hub. Sprocket mounting sector 142 may be connected to the drive hub in any suitable way to prevent that sprocket mounting from moving axially relative to the drive hub.

Sprockets 116, 120, 122, 124, 126 and 130 are connected to mounting means 114 for rotation therewith about axle 102, and the sprockets radially extend outwardly from the mounting means. As shown in FIGS. 1 and 2, assembly 100 includes six sprockets of varying diameters positioned in order according to size, with the smallest sprocket 116 located on the left end of the assembly and the largest sprocket 130 located towards the right end of the sprocket assembly. Further, the sprockets are axially spaced apart a uniform distance, referred to as the sprocket pitch distance.

Sections of different sprockets are axially aligned such that when a first section of a first sprocket is slid out from the plane of that sprocket, the axially aligned section of a neighboring sprocket may be slid into the plane of that first sprocket, into the arcuate or wedge-shaped area vacated by the former sprocket section. With the specific preferred arrangement shown in FIGS. 1 and 2, each sprocket is split along four radial lines, 90° apart, and the radial split lines of the different sprockets are axially aligned. In particular, sprocket sections 116a, 120a, 122a, 124a, 126a and 130a are axially aligned with each other, sprocket sections 116b, 120b, 122b, 124b, 126b and 130b are all aligned; sprocket sections 116c, 120c, 122c, 124c, 126c and 130c are axially aligned with each other; and sprocket sections 116d, 120d, 122d, 124d, 126d and 130d are all aligned.

This preferred arrangement is not necessary to the practice of the present invention; and, for example, the sprocket split lines do not have to extend along radii of the sprockets. What is important is that when a section of a first sprocket is slid out of the plane of that sprocket, the axially aligned section of an adjacent sprocket can be moved into the are vacated by the former sprocket section.

The desired axial alignment of the sprocket sections is obtained by connecting different sections of each sprocket to a different sprocket mounting sector. Specifically, "a" sections of the sprockets are connected to first sprocket mounting sector 134, and "b" sections of the sprockets are connected to second sprocket mounting sector 136. Likewise, "c" sections of the sprockets are connected to third sprocket mounting sector 140, and "d" sections of the sprockets are connected to fourth sprocket mounting sector 142. The sprocket sections may be connected to the sprocket mounting sectors in any suitable way. For instance, each sprocket mounting sector may include a multitude of radial flanges; and the sprocket sections may be axially positioned between or adjacent these radial flanges and connected thereto by screws, bolts or similar fastening means.

Sprocket shift sub assembly 106 is mounted on axle 102 and is connected to sprocket sub assembly 104 to shift the axially moveable sections "a", "b" and "c" of each sprocket from the plane of their original sprocket, into the plane of an adjacent sprocket, and then back again into the plane of their original sprocket; and this is done, as explained in detail later, to shift a chain that is mounted on one of the sprockets from that sprocket to an adjacent sprocket.

Generally, sprocket shift sub assembly 106 has an upshift position to shift the chain from one sprocket to the next smallest sprocket, and a downshift position to shift the chain from one sprocket to the next largest sprocket. More specifically, in the upshift position, shift sub assembly 106 slides first, second and third mounting sectors 134, 136 and 140 in sequence the sprocket pitch distance in a first axial direction, to the right as viewed in FIG. 1, and then slides the first, second and third sprocket mounting sectors together back into their original position along axle 102. This is done so that a chain, originally mounted on one of the sprockets, is sequentially engaged by the first, second and third sections of the next smallest sprocket, and then is carried by those three sprocket sections back into the plane of this next smallest sprocket, where the chain is engaged by the fourth section of this next smallest sprocket.

In the downshift position, the sprocket shift sub assembly 106 slides the first, second and third sprocket mounting sectors 134, 136 and 140 in sequence the sprocket pitch distance in a second axial direction, to the left as viewed in FIG. 1, and then slides the first, second and third mounting sectors together back into their original positions along axle 102. This is done so that a chain, initially mounted on one of the sprockets, is sequentially engaged by the first, second and third sections of the next largest sprocket, and then carried by those three sprocket sections back into the plane of this next largest sprocket, where the chain is engaged by the fourth section of this next largest sprocket.

Figure 7:
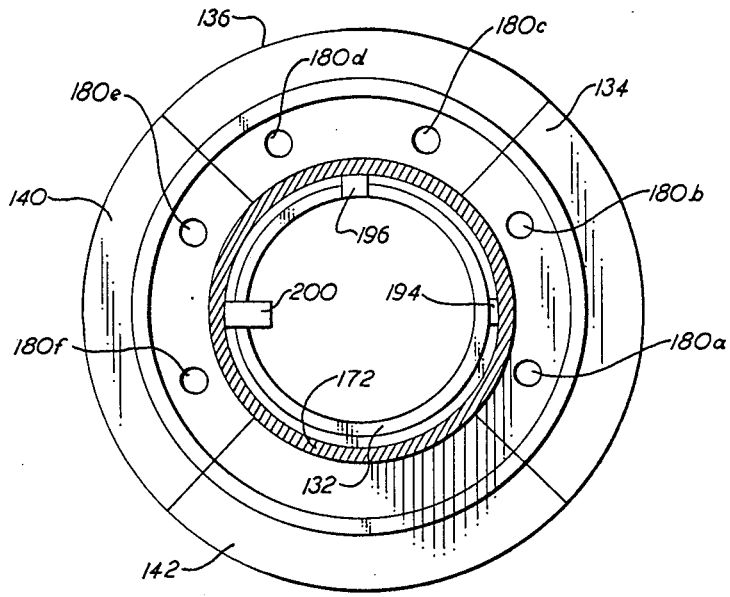
FIG. 7 is an end view showing the sprocket mounting sectors mounted on the drive hub.
Figure 3:
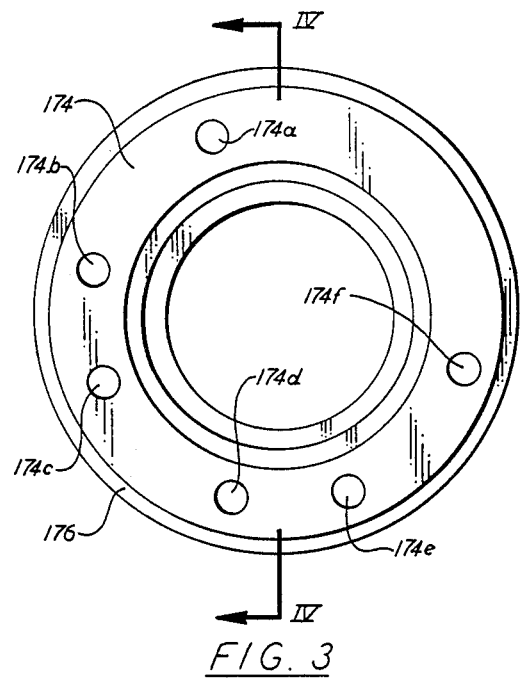
FIGS. 3 and 4 are end and axial cross-sectional views, respectively, of the drive hub of the assembly of FIG. 1, with FIG. 4 taken along line IV—IV of FIG. 3.
Figure 4:
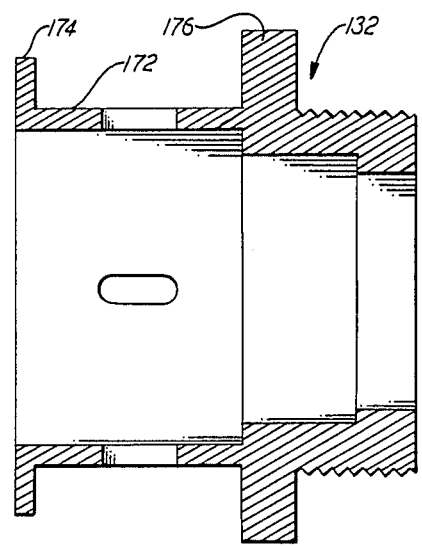
Figure 5:
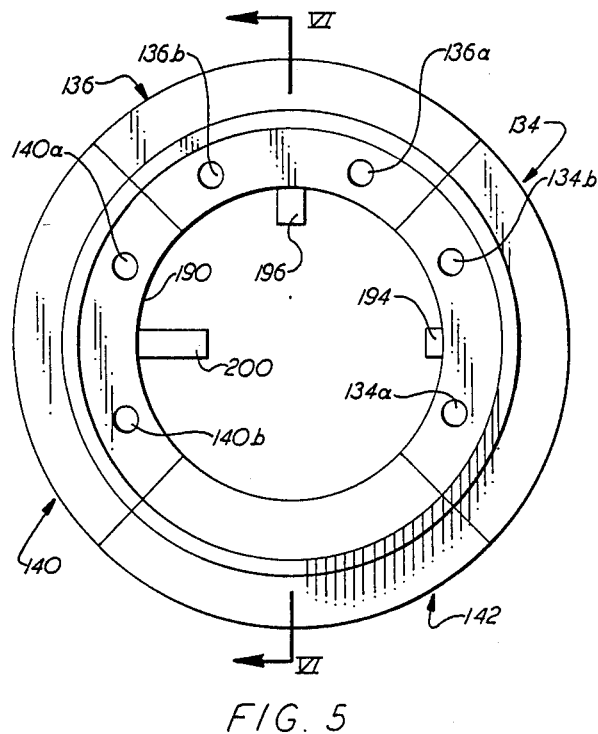
FIGS. 5 and 6 are end and axial cross-sectional views, respectively, of the sprocket mounting sectors of the assembly of FIG. 1, with FIG. 6 taken along line VI—VI of FIG. 5.
Figure 6:
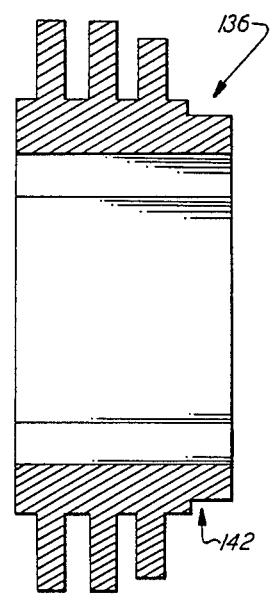
Figure 8:
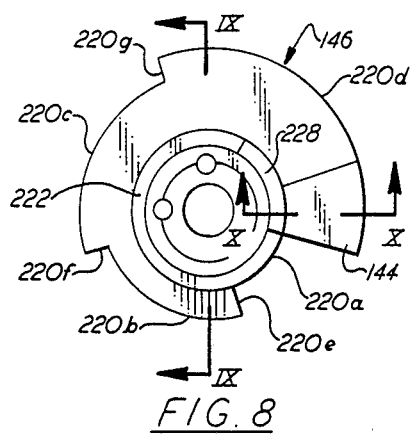
FIG. 8 is an end view of the shift and return cams of the assembly of FIG. 1.
Figure 9:
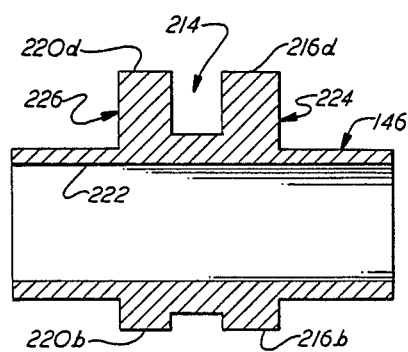
FIGS. 9 and 10 are axial cross-sectional views of the return and shift cams respectively, with FIG. 9 taken along lone IX—IX and FIG. 10 taken along line X—X of FIG. 8.
Figure 10:
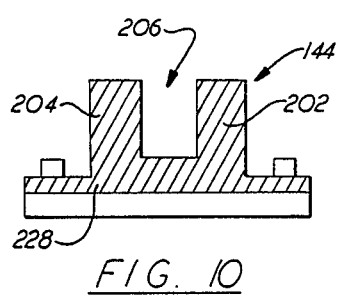

With reference to FIGS. 1, 5 and 7, sprocket mounting sectors 134, 136 and 140 includes shift pegs 194, 196 and 200 respectively, and shift sub assembly 106 includes shift and return cams 144 and 146 to move these pegs and to thereby move sprocket mounting sectors 134, 136 and 140 and the "a," "b," and "c" sprocket sections in the above-described manner. The shift pegs radially extend inward through drive hub 132; and shift peg 194 extends radially inwardly to a depth less than shift peg 196, and this latter shift peg radially extends inward to a depth less than shift peg 200. When sprocket mounting sectors 134, 136 and 140 are in their normal positions on axle 102, shift pegs 194, 196 and 200 are circumferentially aligned and rotate around the axle in a first, or normal, path.

With reference now to FIGS. 1, 8 and 10-12, shift cam 144 includes upshift and downshift tabs 202 and 204 that are spaced apart to form central groove 206; and the shift cam is mounted on axle 102 for axial sliding movement between disengaged, upshift, and downshift positions. In its disengaged position, groove 206 of cam 144 is circumferentially aligned with the above-mentioned normal path of shift pegs 194, 196 and 200 around axle 102 so that the shift cam does not alter movement of these pegs as they move around the axle.

In the upshift position, shift cam 144 is axially slid along axle 102, to the left as viewed in FIGS. 1, so that upshift tab 202 is located in the normal path of movement of the shift pegs around the axle. Tab 202 includes a side surface 210 that slants to the right as viewed in FIG. 11 and when this tab is located in the normal path of movement of the shift pegs, those pegs hit surface 210 one at a time as the pegs rotate round axle 102, and surface 210 forces the shift pegs to the right as viewed in FIGS. 1 and 11 into a second or upshift path around axle 102. Of course, as the shift pegs are shifted to the right, sprocket mounting sectors 134, 136 and 140 and the sprocket sections mounted on those mounting sectors are also shifted to the right.

Even more specifically, as first shift peg 194 rotates around axle 102 and engages surface 210, that peg is forced to the right a distance equal to the sprocket pitch distance. Each "a" sprocket section is moved to the right a distance equal to the sprocket pitch distance and, except for the largest "a" sprocket section 130a, each "a" sprocket section is shifted from the plane of its original sprocket into the plane of the next largest sprocket. This shifting of the "a" sprocket sections is completed before second shift peg 196 engages surface 210; and, when the second shift peg engages surface 210, that peg and each "b" sprocket section is moved to the right a distance equal to the sprocket pitch distance. Each "b" sprocket section, except for the largest one 130b, is shifted from the plane of its original sprocket into the plane of the next largest sprocket. This shifting of the "b" sprocket sections is completed before third shift peg 200 engages surface 210; and when this shift peg engages surface 210, that peg, third sprocket mounting sector 142, and each "c" sprocket section is moved to the right a distance equal to the sprocket pitch distance. When this happens, again except for the largest "c" sprocket section 130c, each "c" sprocket section is shifted from the plane of its original sprocket into the plane of the next largest sprocket.

In the downshift position, shift cam 144 is axially slid to the right along axle 102 so that downshift tab 204 is located in the normal path of movement of the shift pegs around the axle. Tab 204 includes outside surface 212 that slants to the left as viewed in FIG. 11; and when this tab is located in the normal path of movement of the shift pegs, the pegs engage surface 212 one at a time as the pegs rotate around axle, and surface 212 forces the shift pegs to the left as viewed in FIGS. 1 and 11, into a third or up-shift, circumferential path around axle 102. Of course, as the shift pegs are shifted to the left, sprocket mounting sectors 134, 136 and 140 are also shifted to the left and this moves to the left the sprocket sections mounted on those mounting sectors.

Even more specifically, as first shift peg 194 rotates around axle 102 and engages surface 212, that peg is forced to the left a distance equal to the sprocket pitch distance. As this occurs, each "a" sprocket section is moved to the left a distance equal to the sprocket pitch distance, and, except for the smallest "a" sprocket section 116a, each "a" sprocket section is shifted from the plane of its original sprocket into the plane of the next smallest sprocket. This shifting of the "a" sprocket sections is completed before second shift peg 196 engages surface 212; and, when peg 196 engages surface 212, that peg and each "b" sprocket section is moved to the left a distance equal to the sprocket pitch distance. As a result of this, each "b" sprocket section, except for the smallest one 116b, is shifted from the plane of its original sprocket and into the plane of the next smallest sprocket. This shifting of "b" sprocket sections is completed before third shift peg 200 engages surface 212; and when this peg engages this surface, that peg, third sprocket mounting sector 140, and each "c" sprocket section is moved to the left a distance equal to the sprocket pitch distance. When this happens, again except for the smallest "c" sprocket section 116c, each "c" sprocket section is shifted from the plane of its original sprocket and into the plane of the next smallest sprocket.

Figure 11:
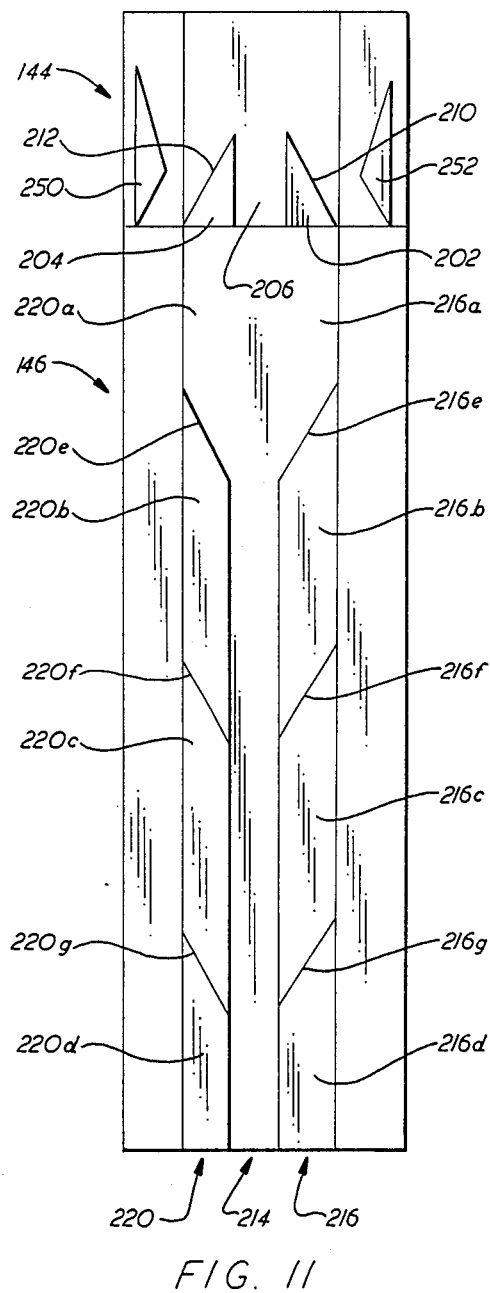
FIG. 11 is a top view of the shift and return cams in an imaginary, developed position, and in particular, where those cams are developed along their inside circumferential surfaces onto a flat plane.

Return cam 146 is mounted on axle 102 to return shift pegs 194, 196 and 200 to their normal path around the axle, from either their upshift or downshift paths. More specifically, with reference to FIGS. 1, 8, 11 and 12, return cam 146 is mounted on axle 102 and includes a central groove 214 and first and second stepped sections 216 and 220. Stepped section 216 includes four levels 216a–d and three shoulders 216e–g, and stepped section 220 includes four levels 220a–d and three shoulders 220e–g. The height of levels 216a and 220a are such that all three shift pegs can pass over them without engaging the levels; and the height of levels 216b and 220b are such that pegs 194 and 196, but not peg 200, can pass over them without engaging these level. The height of levels 216c and 220c are such that peg 194, but neither peg 196 or peg 200, can pass over them without engaging these levels, and the height of levels 216d and 220d are such that none of the shift pegs can pass over them. Shoulders 216e–g, which all slant downward to the left as viewed in FIG. 11, are located at the ends of levels 216a–c respectively; and shoulders 220e–g, which all slant downward to the right as viewed in FIG. 11, are located at the ends of levels 220a–c respectively.

With the above-described arrangement, after first shift peg 194 is moved to the upshift or downshift paths around axle 102, that peg, as it continues to move around the axle, rides over either levels 216a–c or levels 220a–c, until the peg engages shoulder 216g or 220g, which forces the shift peg back into its normal path around the axle. This forces first sprocket mounting sector 134 back to its original position along axle 102, and move the "a" sprocket sections all back into the planes of their original sprockets. After second peg 196 is shifted to the upshift or downshift paths around axle 102, that peg, as it continues to move around the axle, rides over either levels 216a and b or 220a and b until the peg engages shoulder 216f or 220f, which forces the shift peg into its normal path around the axle. This forces second sprocket mounting sector 136 back to its original position along axle 102, and moves the "b" sprocket sections all back into the planes of their original sprockets.

After third shift peg 200 is shifted to the upshift or downshift paths around axle 102, that peg, as it continues to move around the axle, rides over either level 216a or 220b until the shift peg engages shoulder 216e or 220e, which forces the shift peg back into its normal path around the axle. This forces third sprocket mounting sector 140 back to its original position along axle 102, and moves the "c" sprocket sections all back into the planes of their original sprockets. Preferably, shoulders 216e–g and 220e–g are circumferentially spaced apart the same distance as shift pegs 194, 196 and 200. In this way, as pegs 194, 196 and 200 move around axle 102 in their upshift path, the pegs 194, 196 and 200 engage shoulders 216e–g respectively at the same time; and as the shift pegs move around axle 102 in their downshift path, the pegs 194, 196 and 200 engage shoulders 220e–g respectively at the same time. Because of this, the "a," "b," and "c" sprocket sections are all moved simultaneously from either their upshift or downshift locations, back into the planes of their original sprockets.

The preferred embodiment of return cam 146 illustrated in FIGS. 1, 8, 9, 11 and 12 comprises sleeve portion 222 and first and second radial flanges 224 and 226. Sleeve portion 222 is mounted on axle 102 and circumferentially extends therearound for about 280°, and the outside surface of this sleeve portion itself forms first levels 216a and 220a of stepped sections 216 and 220. Radial flanges 224 and 226 are parallel to each other, extend outward from sleeve portion 222, and form levels 216b-d and 220b-d and shoulders 216e-g and 220e-g. Flanges 224 and 226 are also spaced apart from each other and thereby define groove 214, and return cam 146 is mounted on axle 102 such that groove 214 is aligned with the above-mentioned normal circumferential path of the shift pegs around the axle.

As shown in FIGS. 1, 8 and 10-12, preferably, shift cam 144 includes arcuate base portion 228 mounted on axle 102, between circumferential ends of sleeve portion 222 of return cam 146, and this base portion of the shift cam is radially captured between the axle and flanges 224 and 226 of the return cam. Tabs 202 and 204 extend radially outward from arcuate base portion 228, and shift cam 144 is mounted on axle 102 so that groove 206 is normally aligned with groove 214 of return cam 146 and, hence, with the normal path of movement of the shift pegs around the axle.

Actuator means 110 is connected to sprocket shift sub assembly 106 to move that assembly from its disengaged position to its engaged positions—that is, to either its upshift or downshift positions. More particularly, shift cam 144 is securely connected to pin 154 for axial movement therewith; and pin 154 radially extends inward from shift cam 144, through radial opening 166 and into end socket 164 of axle 102. Base member 156 is located in socket 164 and is securely connected to pin 154. Actuator rod 160 is supported in socket 164 for axial sliding movement toward and away from base member 156, and spring 162 is connected to and extends between the actuator rod and the base member to transfer forces to this base member from the actuator rod.

In use, the outward end of actuation rod 160 is connected to a solid but flexible means such as a cable, that is pushed or pulled from a location outside axle 102 to push or pull actuator rod 160 in socket 164. For instance, if assembly 100 is used on a bicycle, a cable may be connected to actuator rod 160 and extend therefrom to a lever or handle connected to the handle bars of the bicycle. As the cable is pushed into socket 164, the cable pushes actuator rod 160; and this force is transmitted to pin 154, via spring 162 and base member 156, urging shift cam 144 toward or into its downshift position. Conversely, if the cable is pulled outward, the cable pulls actuator rod 160 outward; and this force is transmitted to pin 154, via spring 162 and base member 156, urging shift cam 144 toward or into its upshift position.

Sprocket shift assembly 100 is very well suited for use with a driving chain 230 as shown in FIG. 13. Chain 230 is mounted on one of the sprockets, for example sprocket 122, and also mounted on a drive sprocket (not shown); and the drive sprocket is rotated to pull the chain around sprocket 122, rotating that sprocket and the entire sprocket sub assembly 104.

During this operation of sprocket shift assembly 100, chain 230 directly seats on the outside edge of a sprocket for a little more than about half the circumference thereof. The point where chain 230 moves into the circumference of sprocket 122 is identified as point A in FIG. 13, and the point where the chain moves out of the circumference of this sprocket is identified as point B in FIG. 13. The arc between points A and B along the outside edge of sprocket 122 defines a clearance arc where the sprocket does not directly engage chain 230, and the radial lines extending between the center of sprocket 122 and points A and B define a clearance wedge or area 232.

Preferably, as the "a," "b" and "c" sprocket sections are moved from the planes of their original sprockets and into the planes of adjacent sprockets, each of these sprocket sections is so moved while it is inside clearance area 232; and, moreover, the "a" sprocket sections are moved first, then the "b" sprocket sections are moved, and the "c" sprocket sections are moved last. Shift initiation cams 150 and 152 are connected to sprocket sub assembly 104 to insure that the sprocket sections are shifted in this preferred order. With reference to FIGS. 1 and 14-17, shift initiation cams 150 and 152 are connected to mounting sector 142 and drive hub 132 respectively for rotation therewith, and the shift initiation cams are located on different axial sides of shift cam 144. Each shift initiation cam 150, 152 include an inside circumferential edge 240, 242, and a recess 244, 246, radially extending outward from that edge, for about 100° along that edge. Also, shift cam 144 includes left and right control tabs 250, 252; and as shown in FIG. 1, when the shift cam is in its disengaged position, shift initiation cam 150 is immediately to the left or left control tab 250, and shift initiation cam 152 is immediately to the right of right control tab 252. Shift initiation cams 150 and 152 are connected to sprocket sub assembly 104 so that recesses 244 and 246 are immediately next to tabs 250 and 252 respectively when first sprocket mounting sector 234, and thus the "a" sprocket sections, are in clearance area 232.

As long as a solid portion of shift initiation cam 150 is immediately to the left of tab 250, cam 150 prevents that tab, and hence shift cam 144, from moving to the left to its upshift position, and this of course prevent the shift cam from moving the shift pegs and the "a" , "b" and "c" sprocket sections to the right. However, when recess 244 is located immediately to the left of tab 250, that tab can move to the left, into and through recess 244, allowing shift cam 144 to move to its upshift position. Similarly, as long as a solid portion of shift initiation cam 152 is immediately to the right of tab 252, that cam 152 prevents taht tab, and hence shift cam 144, from moving to the right to its downshift position, and this prevents the shift cam 144 from moving the shift pegs and the "a" , "b" and "c" sprocket sections to the left. When recess 246 is located immediately to the right of tab 252, though, this tab can move to the right, into and through that recess, allowing shift cam 144 to move to its downshift position.

It is not necessary that the forces transmitted to shift cam 140 via pin 154 move tabs 250 or 252 completely through recesses 244 and 246 respectively. If the force transmitted to shift cam 140 via pin 154 to move the shift-cam toward the upshift position does not actually move tab 250 completely through recess 244, then, as cam 150 continues to rotate around axle 102, the edge 240a at the leading end of edge 240 of cam 150 contacts and pushes tab 250 to the outside of cam 150, forcing the shift cam into its upshift position. Analogously, if the force transmitted to shift cam 140 via pin 154 to move the shift cam toward its downshift position does not move tab 252 completely through recess 246, then, as cam 152 continues to rotate around axle 102, the edge 242a at the leading end of edge 242 of cam 152 contacts and pushes tab 252 to the outside of cam 152, forcing the shift cam into its downshift position. Edges 240a and 242a may be slanted to help slide tabs 250 and 252 along those edges. Thus, the force transmitted to shift cam 140 via pin 154 may be used simply to start movement of the shift cam into its upshift and downshift positions, with movement of the shift cam into those positions completed either by contact between edge 240a and tab 250 or by contact between edge 242a and tab 252.

Once shift cam 144 has been shifted into the upshift or downshift position, cams 150 and 152 perform the added function of holding the shift cam in its upshift or downshift position until the shift cam moves all three shift pegs either to their upshift or downshift paths around axle 102. To elaborate, once tab 250 is axially moved to the left of cam 150 and this cam rotates so that a solid portion of the cam is immediately to the right of that tab, the cam prevents tab 250 and shift cam 144 from moving back to the right, holding the shift cam 144 in its upshift position. Cam 150 holds shift cam 144 in this position until the next time recess 244 rotates past tab 250, at which time the tab is able to slide to the right, through recess 244, allowing the shift cam 144 to return to its disengaged position.

Analogously, once tab 252 is axially moved to the right of cam 152 and this cam rotates so that a solid portion of the cam is immediately to the left of the tab, cam 152 prevents tab 252 and shift cam 144 from moving back to the left, holding the shift cam 144 in its downshift position. Cam 152 holds shift cam 144 in this position until the next time recess 246 rotates past tab 252, at which time the tab is able to slide to the left, through the recess, allowing the shift cam 144 to return to its disengaged position.

Preferably, sprocket shift sub assembly 106 also includes return tabs 254 and 256 to move shift cam 144 back into its disengaged position from either its upshift or downshift position, after that cam has itself pushed each of the shift pegs into either their upshift or downshift paths. Tabs 254 and 256 are secured to cams 150 and 156 respectively for rotary movement therewith, and the tabs extend axially inward therefrom toward groove 206 of shift cam 144. Return tab 254 is positioned so that, when shift cam 144 is in its upshift position, the return tab is circumferentially aligned with downshift tab 204 of the shift cam; and return tab 256 is positioned so that, when shift cam 144 is in its downshift position, this return tab is circumferentially aligned with upshift tab 202 of the shift cam. At the same time, return tabs 254 and 256 are positioned on cams 150 and 156 so that when shift cam 144 is in either the upshift or downshift position, the return tabs engage the shift cam shortly after third shift peg 200 has itself engaged the shift cam and has been moved into either the upshift or downshift path, and also shortly after recesses 244 and 246 become axially aligned with control tabs 250 and 252.

In operation, when shift cam 144 is in its upshift position and after the cam has shifted all three shift pegs into their upshift path, return tab 254 comes into contact with downshift tab 204 and further rotation of this return tab around axle 102 pushes the shift cam to the right as viewed in FIG. 1. Control tab 250 of shift cam 144 is pushed through recess 244 of cam 150, and the shift cam returns to its disengaged position. Analogously, when shift cam 144 is in its downshift position and after the cam has moved all three shift pegs into their downshift path, return tab 256 comes into contact with upshift tab 202. Further rotation of return tab 254 pushes shift cam 144 to the left as viewed in FIG. 1, and control tab 252 of the shift cam is pushed through recess 246 of cam 152 and the shift cam returns to its disengaged position.

Sprocket assembly 100 may be used to drive a wheel (not shown) mounted on a wheel hub 260, which in turn is mounted on axle 102. In this case, sprocket mounting means 114 may be provided with means 262 connected to drive hub 132 to transmit rotary movement therefrom to wheel hub 260. Preferably, means 262 includes first and second members connected together by a ratchet connection (not shown) allowing free rotation of wheel hub 260 relative to drive hub 132 in a first direction, but insuring that rotation of the drive hub in the first direction drives the wheel hub.

Assembly retainer means 112 is provided to hold the sprocket and shift sub assemblies 104 and 106 on axle 102; and with the embodiment of the invention shown in FIG. 1, this retainer means includes retainer disc 264 and bearing nut 266 respectively mounted on the first and second threaded end portions of axle 102. Retainer disc 264 axially abuts against return cam 146, and nut 266 axially abuts against wheel hub 260, sandwiching the return cam, drive hub 132, bearing 170, connecting means 162, and the wheel hub on axle 102 between cam 150 and the bearing nut.

Drive hub 132 may include an inside radial flange holding bearing 170 against axial movement to the right as viewed in FIG. 1, and spacing ring 270 may be located between return cam 146 and bearing 170 to hold this bearing against axial movement to the left. Spacing ring 270 limits axial sliding movement of shift cam 144 to the right as viewed in FIG. 1, and retainer disc 264 limits axial movement of the shift cam to the left. Drive hub 132 includes an outside radial flange to limit axial sliding movement of sprocket mounting sectors 134, 136 and 140 to the right, and retainer disc 264 limits axial sliding movement of these sprocket mounting sectors to the left.

Figure 18:
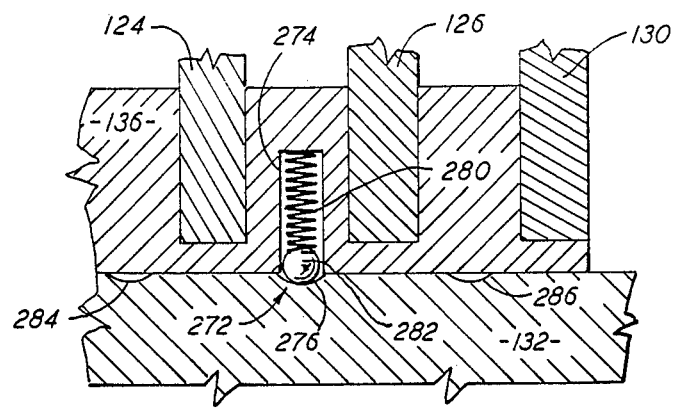
FIG. 18 is a partial axial cross-sectional view showing means to lightly hold a sprocket mounting sector in a centered position on the drive hub.

Sprocket sub-assembly 104 may also be provided with means to lightly hold the mounting sectors 134, 136 and 140 in their centered position—that is, with shift pegs 194, 196 and 200 in their normal path around axle 102. FIG. 18 shows one such holding means 272 that is specifically used to lightly hold mounting sector 136 in its centered position; and this holding means generally comprises socket 274, recess 276, spring 280 and ball bearing 282. Socket 274 is formed in mounting sector 136, and extends radially outward from an outside surface of drive hub 132; and recess 276 is located immediately opposite socket 274, in that outside surface of the drive hub. Spring 280 is positioned in socket 274, and an end of that spring engages ball bearing 282 and urges that bearing into recess 276. Bearing 282 holds mounting sector 136 against most axial forces that may be encountered by the mounting sector during normal operation of assembly 100; however, during shifting of chain 230, bearing 282 is pushed outward by drive hub 132 against spring 280 and into socket 274, allowing mounting sector 136 to move along the drive hub.

A second recess 284, located to the left of recess 276 as shown in FIG. 18, may be provided to receive ball bearing 282 when mounting sector 136 is in an upshift position—that is, when shift peg 196 in its upshift path—to lightly hold the mounting sector in that position. Similarly, a third recess 286 may be located to the right of recess 276 as shown in FIG. 18 to receive bearing 282 when mounting sector 136 is in a downshift position—that is, when shift peg 196 is in its downshift path—to thereby lightly hold the mounting sector in that position. Preferably, a separate, light holding means 272 is provided for each of the mounting sectors 134, 136 and 140; and it may be noted that instead of locating socket 274 in the mounting sector and locating the recess or recesses for ball bearing 282 in drive hub 132, socket 274 may be located in the drive hub, and the recess or recesses for the ball bearing may be located in the mounting sector.

Light holding means (not shown in the drawings) may also be used to lightly hold shift cam 144 in its disengaged, upshift and downshift positions. Such means may be similar to light holding means 272 described above and may comprise, for instance, a radial socket formed in shift cam 144 and a plurality of small axially spaced recesses formed in the outside circumferential surface of axle 102, opposite the socket in the shift cam. A spring may be located in this socket in shift cam 144, and this spring may engage a ball bearing and urge that bearing into a different recess in the axle, depending on the position of the shift cam, to lightly hold the shift cam in its different positions.

Figure 19:
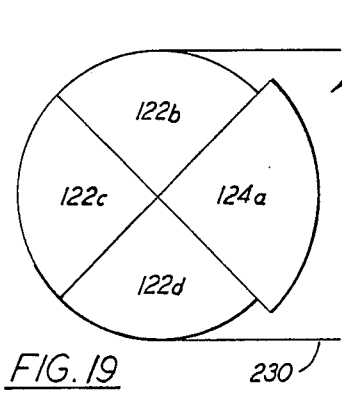
FIGS. 19–22 are schematic drawings showing how sprocket sections of one sprocket are shifted, one at a time, into the plane of an adjacent sprocket.

The operation of sprocket shift assembly 100 to move a chain from sprocket 122 to sprocket 124 will now be briefly summarized principally with reference to FIGS. 1, 13 and 19-22. To start this shifting process, actuator rod 160 is pushed inward in axle socket 164, urging shift cam 144 towards its downshift position. Shift initiation cam 152 prevents movement of shift cam 144 into its downshift position until the "a" sprocket sections are in clearance area 232. When this occurs, recess 246 of cam 152 is axially aligned with tab 252 of shift cam 144, and that tab slides through this recess and shift cam 144 moves to the right as viewed in FIG. 1, into its downshift position. Shift initiation cam 152 is positioned so that this occurs just prior to first shift peg 194 moving past shift cam 144. Thus, the next time shift peg 194 moves past shift cam 144, this shift peg engages tab 204 and the "a" sprocket sections are moved the sprocket pitch distance to the left, and in particular sprocket section 124a is moved into the plane of sprocket 122. This movement of the "a" sprocket sections is completed while those sprocket sections are still inside clearance area 232, as illustrated in FIG. 19; and as sprocket hub assembly 104 continues to rotate around axle 102, chain 230 is engaged by and becomes mounted on sprocket section 124a.

Figure 20:
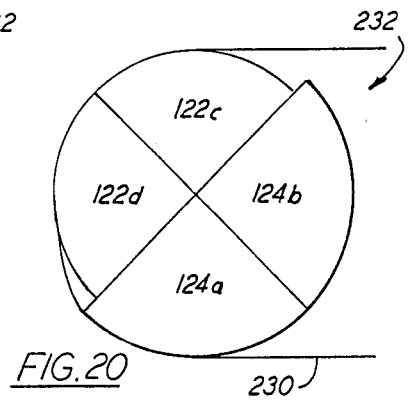

When the "b" sprocket sections are in clearance area 232, second shift peg 196 engages downshift tab 204, which guides that shift peg into the downshift path. The "b" sprocket sections are moved the sprocket pitch distance to the left, and in particular, sprocket section 124b moves into the plane of sprocket 122. This movement of the "b" sprocket sections is completed while those sprocket sections are in clearance area 232, as illustrated in FIG. 20; and as sprocket assembly 104 continues to rotate, chain 230 is engaged by and becomes mounted on sprocket section 124b.

Figure 21:
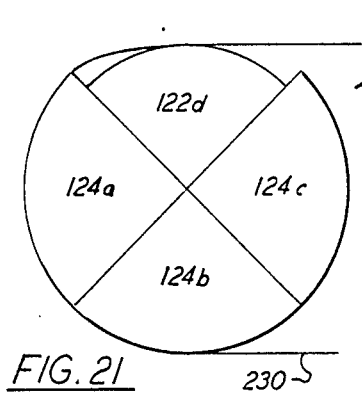

When the "c" sprocket sections are within clearance area 232, third shift peg 200 engages the downshift tab 204, which guides that shift peg into the downshift path. The "c" sprocket sections are moved the sprocket pitch distance to the left, and in particular, sprocket section 124c is moved into the plane of sprocket 122. This movement of the "c" sprocket sections is completed while those sprocket sections are in clearance area 232, as illustrated in FIG. 21; and as sprocket sub assembly 104 continues to rotate, chain 230 is engaged by and becomes mounted on sprocket section 124c.

Figure 22:
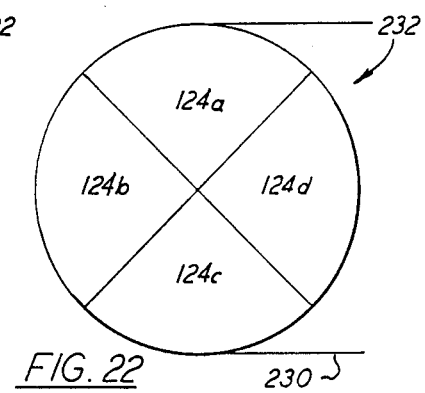

During this shifting process, the "d" sprocket sections do not move axially. By the time the "d" sprocket sections are in clearance area 232, chain 230 is completely mounted on the "a", "b" and "c" sections of the new sprocket so that the chain will move axially with these sprocket sections; and these sprocket sections are shifted together back into their original plane, moving the chain with them. More specifically, when the "d" sprocket sections are completely within clearance area 232, shift pegs 194, 196 and 200 respectively engage shoulders 220e, f and g of return cam 146 and are pushed by those shoulders back into their normal path around axle 102, pushing the "a", "b" and "c" sprocket sections back into their normal positions on the axle, and in particular, moving sprocket sections 124a, b and c and chain 230 into the plane of sprocket 124, completing the shift of the chain to the new sprocket. This movement of the chain and the sprocket sections is completed while the "d" sprocket sections are still completely within clearance area 232, as illustrated in FIG. 22.

Chain 230 comprises a series of spaced apart, connected links, and the teeth of each of the sprockets 116, 120, 122, 124, 126 and 130 are circumferentially spaced apart so that normally when the chain seats on a sprocket, the links of the chain seat on the bottoms of the recesses between the teeth of the sprocket. Sprockets 116, 120, 122, 124, 126 and 130 may be split and positioned so that as chain 230 is being shifted from a smaller sprocket to a larger sprocket, the links of the chain seat on the bottoms of the recesses between the teeth of the larger sprocket as soon as those links engage the larger sprocket. With such an arrangement, as chain 230 is being shifted from a larger sprocket to a smaller sprocket, the links of the chain do not immediately seat on the bottoms of the recesses between the teeth of the smaller sprocket as soon as the links engage the smaller sprocket; and the chain will move slightly, once it is fully engaged by the smaller sprocket, so taht the chain links then seat on the bottoms of those recesses.

Alternatively, with a compromise arrangement, sprockets 116, 120, 122, 124, 126 and 130 may be split and positioned so that both when chain 230 is being shifted from a smaller sprocket to a larger sprocket and vice versa, the links of the chain, upon engagement with the new sprocket, seat close to, but not exactly on, the bottoms of the recesses between the teeth of the new sprocket, and the chain moves slightly once it is fully engaged by the new sprocket to seat the chain links on the bottoms of those recesses.

As will be understood, it is not necessary to this invention in its broadest sense that each sprocket of assembly 100 be split into four sections; and, with modifications within the ability of those of ordinary skill in the art, each sprocket of assembly 100 may be split into only two sections, with only a first section of each sprocket being axially moveable relative to the second section of the sprocket.

Figure 23:
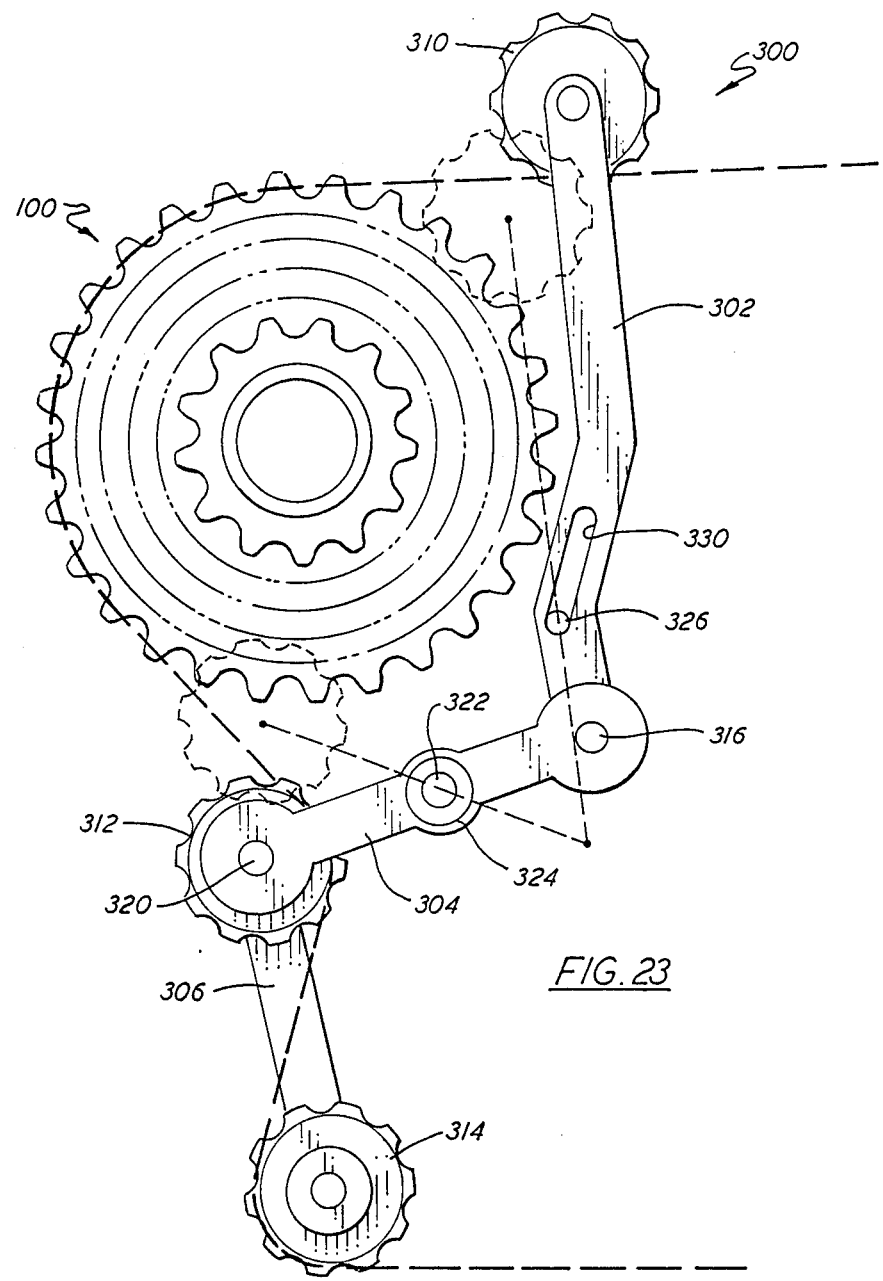
FIG. 23 shows a tensioning mechanism that may be used with the sprocket assembly of this invention.

FIG. 23 illustrates tensioning mechanism 300 to maintain an appropriate tension on chain 230 during operation of sprocket assembly 100; and generally mechanism 300 comprises first, second and third links 302, 304 and 306, and first, second and third pulleys 310, 312 and 314. Pulleys 310, 312 and 314 are rotatably mounted on links 302, 304 and 306 respectively, links 304 and 306 are pivotally connected together via pin 316, and links 304 and 306 are pivotally connected together via pin 320. A spring (not shown) is connected to links 304 and 306 and urges this latter link to pivot clockwise as shown in FIG. 22 about pin 320.

Mechanism 300 is pivotally mounted on pin or rod 322, which extends through a central opening 324 in link 304. Rod 322, in turn, is fixed to a frame or support member that is fixed relative to the axle 102 of sprocket assembly 100; and, for example, if sprocket assembly 100 is mounted on a bicycle frame, rod 322 may be fixed to that same frame. A second rod or pin 326 is also fixed to that frame or support member for mechanism 300 and extends through slot 330 in the lower end of link 302 to guide movement of this link.

The path of chain 230 is shown in broken lines in FIG. 22; and as the chain is pulled or driven over sprocket assembly 100, the top portion of the chain is under a high tension, holding pulley 310 and link 302 in tension. This force is transmitted to link 306 by links 302 and 304, limiting the extent to which link 306 pivots clockwise about pin 320, and the end result is that the lower portion of the chain 230 is held with a suitable tension.

When chain 230 is shifted from one sprocket to a smaller sprocket of assembly 100, link 306 pivots clockwise about pin 320. This pivots link 304 about rod 322, and this pulls the lower end of link 302 downwards as shown in broken lines FIG. 21. Positioning pin 326 forces link 302 to move so as to pull pulley 310 downward and to the left, insuring that the proper tension is transmitted to and maintained on the lower portion of chain 230. Tensioning mechanism 300 is also slidably mounted on pins 322 and 326; and as chain 230 moves from the plane of one sprocket to the plane of a second sprocket, the chain moves the tensioning mechanism along the axis of pins 322 and 326 to keep the tensioning mechanism in the plane of the chain. A linear bearing 332 may be located between pin 322 and link 304 to facilitate pivotal and sliding movement of this link relative to pin 322.

During normal operation of sprocket assembly 100 and tensioning mechanism 300, axial forces might be exerted on the tensioning mechanism tending to slide that mechanism along pins 322 and 326. For example, if assembly 100 and mechanism 300 are used on a bicycle, the tensioning mechanism might tend to slide along pins 322 and 326 as the bicycle is ridden around a turn or corner. Axial sliding movement of tensioning mechanism 300 is undesirable since it may tend to pull chain 230 off of the sprocket on which it is mounted. With the arrangement of mechanism 300 shown in FIG. 23, the high tension of the upper part of chain 232 against pulley 310 holds this pulley, and hence the rest of the tensioning mechanism including pulleys 312 and 314, against axial movement relative to the chain along pin 322 and 326. In practice, the tensioning mechanism may slide slightly along that pin, with the tension of chain 232 against pulley 310 used simply to retard or brake that sliding movement sufficiently to prevent pulleys 312 and 314 from pulling the chain off the sprocket on which it is mounted.

During a shifting process, as chain 230 is shifted from a first sprocket to a second sprocket, the portion of the chain that engages pulley 310 does not move vertically until the chain is fully engaged by that second sprocket. Consequently, during such a shifting process, the axis of pulley 310 remains in a fixed position, and this holds the axes of pulleys 312 and 314 stationary until chain 230 is fully engaged by the second sprocket.

Figure 24:
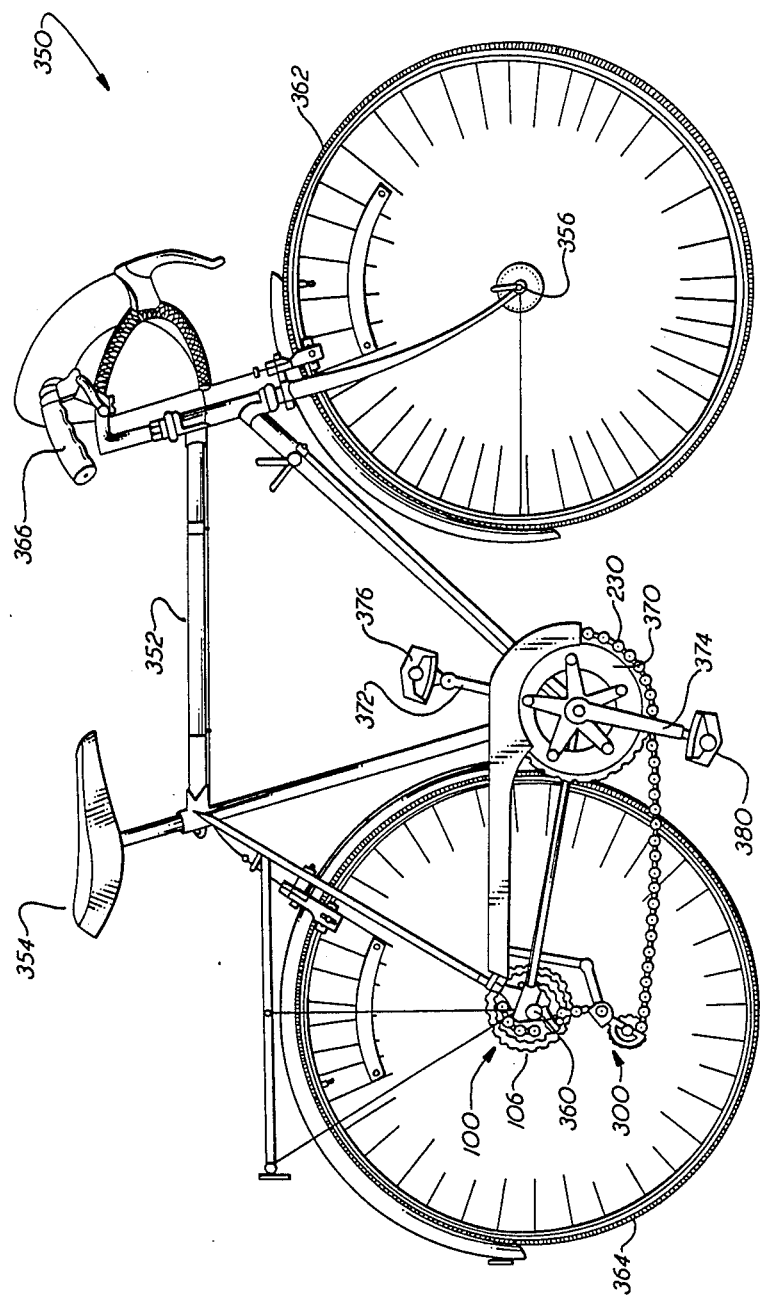
FIG. 24 is a side elevation view of a bicycle having the sprocket shift assembly illustrated in FIGS. 1–21.

FIG. 24 illustrates a bicycle 350 having sprocket shift assembly 100; and the bicycle further includes frame 352, seat 354, front and back axles 356 and 360, front and back wheels 362 and 364, handlebars 366, drive sprocket 370, chain 230, left and right crank arms 372 and 374, and left and right pedals 376 and 380. More specifically, seat 354 is connected to frame 352 to support a rider, and front and back axles 356 and 360 are supported by the bicycle frame and define front and back axes respectively. Front wheel 362 is mounted on front axle 356 for rotation about the front axis, back wheel 364 is mounted on back axle 360 for rotation about the baxk axis, and handlebars 366 are connected to frame 352 to steer bicycle 150.

Drive sprocket 366 is rotatably supported by frame 352, and drive chain 230 is mounted on the drive sprocket. Left and right crank arms 372 and 374 are connected to the drive sprocket 366 for rotation therewith, and left and right pedals 376 and 380 are connected to the left and right crank arms, respectively, to rotate the crank arms and, hence, the drive sprocket. The frame, seat, front axle, wheels, drive sprocket, drive chain, crank arms, pedals and handlebars of bicycle 350 may all be conventional bicycle parts and operate in a conventional manner in the bicycle, and it is unnecessary to describe these parts or their operation in detail herein.

Axle 360 of bicycle 350 is used as axle 102 of sprocket shift assembly 100, and sprocket sub-assembly 104 is mounted on axle 360 for rotation about the back axis of the bicycle. Drive chain 230 is also mounted on one of the sprockets of sub-assembly 104 and shift sub-assembly 106 (not shown in FIG. 24) is also mounted on axle 360 and operates, as discussed above, to selectively shift the drive chain from one sprocket of sub-asswembly 104 to another sprocket thereof. Tensioning mechanism 300 may be connected to frame 352 to maintain an appropriate tension on chain 230 as it moves from drive sprocket 370 to sprocket shift assembly 100.

FIGS. 25–28 illustrate an alternate pulley shift assembly 400 also in accordance with the present invention. Assembly 400 is similar to assemby 100 in that assembly 400 includes an elongated axle 402, a pulley sub-assembly 404, a shift sub-assembly 406, and actuator means 410, with the pulley sub assembly including a plurality of pulleys 412, 414, 416, 420, 422, 424, 426 and 430, and with each of these pulleys including a plurality of sections a–d. The "a" sections of the pulleys are referenced by the arrow "a" in FIG. 26, while the "b" "c" and "d" pulley sections are referenced by the arrows "b" "c" and "d" respectively in FIG. 26. Apparatuses 100 and 400 differ principally in that, with the latter aparatus, first, shift sub-assembly 406 is axially located outside the pulleys; and second, during a particular shifting process, all of the sections a–d of the pulleys are moved to shift a belt from one pulley to another, and the pulley sections are not shifted back into their oroginal planes.

Axle 402 defines an axis of assembly 400, and pulley sub-assembly 404 is mounted on the axle for rotation about the axis thereof. Each section a–d of each pulley is axially moveable relative to the other section or sections of the pulley, and the pulleys have a normal position (shown in FIG. 25) where all of the sections of each pulley are coplanar and the pulleys are axially spaced apart a preset distance, referred to as the pulley pitch distance.

Preferably, pulley sub-assembly 404 further includes a plurality of pulley mounting sectors 436, 440, 442 and 444 rotatably mounted on axle 402, analogous to sprocket mounting sectors 134, 136, 140 and 142 of assembly 100; however, with pulley sub-assembly 404, all of the pulley mounting sectors are supported for axial sliding movement along axle 402. Assembly 400 may be provided with a drive hub and a bearing analogous to drive hub 132 and bearing 170 of assembly 100; and mounting sectors 436, 440, 442, and 444 of assembly 400 may be mounted on the drive hub the same way sprocket mounting sectors 134, 136, and 140 are mounted on drive hub 132.

Figure 25:
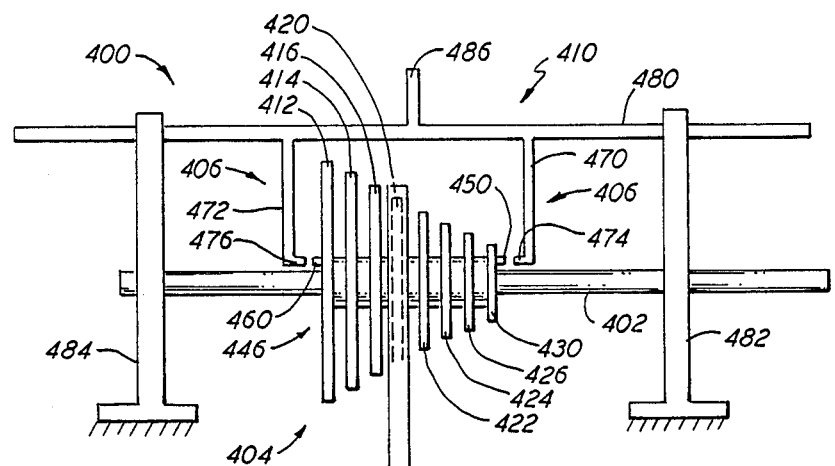
FIG. 25 shows an alternate pulley shift assembly of this invention.
Figure 26:
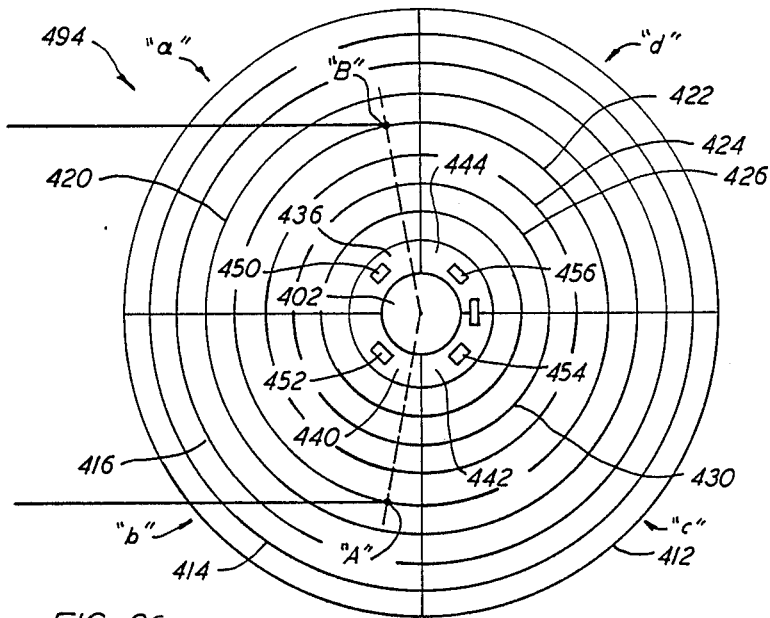
FIGS. 26 and 27 are left and right end views of a pulley sub-assembly of the assembly illustrated in FIG. 25.

As specifically shown in FIGS. 25 and 26, assembly 400 includes eight pulleys of varying diameters grouped together in a cluster 446 and positioned in order according to size, with the smallest pulley located toward the right end of the assembly and with the largest pulley located toward the left end of the assembly. Analogous to the sprocket sections of assembly 100, sections of different pulleys of assembly 400 are axially aligned so that when a first section of a first pulley is slid out from the plane of that pulley, the axially aligned section of a neighboring pulley may be slid into the plane of that first pulley, into the area vacated by the former pulley section.

In particular, the "a" sections of pulleys 412, 414, 416, 420, 422, 426 and 430 are axially aligned with each other, the "b" pulley sections are all aligned, the "c" pulley sections are aligned with each other, and the "d" pully sections are all aligned. The desired axial alignment of the pulley sections is obtained by connecting different sections of each pulley to a different pulley mounting sector. Specifically, the "a," "b," "c" and "d" pulley sections are respectively connected to mounting sectors 436, 440, 442 and 444; and this may be done in the same way the sprocket sections of assembly 100 are connected to mounting sectors 134, 136, 140 and 142.

Shift sub-assembly 406 is located adjacent pulley sub-assembly 404; and the shift sub-assembly has a disengaged position for maintaining the pulleys 412, 414, 416, 420, 422, 424, 426 and 430 in the normal position, and in an engaged position to slide all of the sections of each of the pulleys the pulley pitch distance along axle 402.

The engaged position of shift sub assembly 406 includes an upshift position to shift a belt from one pulley to the next smallest pulley, and a downshift position to shift the belt from one pulley to the next largest pulley. More specifically, in the upshift position, shift sub-assembly 406 slides pulley mounting sectors 436, 440, 442 and 444 one at a time the pulley pitch distance in a first axial direction, to the left as view in FIG. 25; and this is done so that a belt, originally mounted on one of the pulleys 412, 414, 416, 420, 422, 424, 426 and 430, is sequentially engaged by first, second, third and fourth sections of the next smallest pulley. In the downshift position, shift assembly 406 slides pulley mounting sectors 436, 440, 442 and 444 one at a time the pulley pitch distance in a second axial direction, to the right as viewed in FIG. 25, and this is done so that a belt, initially mounted on one of the pulleys, is sequentially engaged by first, second, third and fourth sections of the next largest pulley.

With the preferred assembly 400 shown in FIGS. 25-28, this movement of mounting sectors 436, 440, 442 and 444 is effected by upshift cams 450, 452, 454 and 456 (shown in FIG. 26), downshift cams 460, 462, 464, and 466 (shown in FIG. 27), and upshift and downshift arms 470 and 472. More specifically, a different upshift cam is connected to each mounting sector 436, 440, 442 and 444, and in use these cams rotate around axle 402 in a first path. Similarly, a different downshift cam is connected to each mounting sector, and in use these cams rotate around axle 402 in a second path. When shift sub-assembly 406 is in the upshift position, upshift arm 470 extends into the above-mentioned path of movement of the upshift cams to engage the cams one at a time and force the pulley mounting sectors the pulley pitch distance to the left as viewed in FIG. 25. When shift sub-assembly 406 is in the downshift position, downshift arm 472 extends into the above-mentioned path of movement of the downshift cams to engage those cams one at a time and force the pulley mounting sectors the pulley pitch distance to the right as viewed in FIG. 25.

Figure 27:
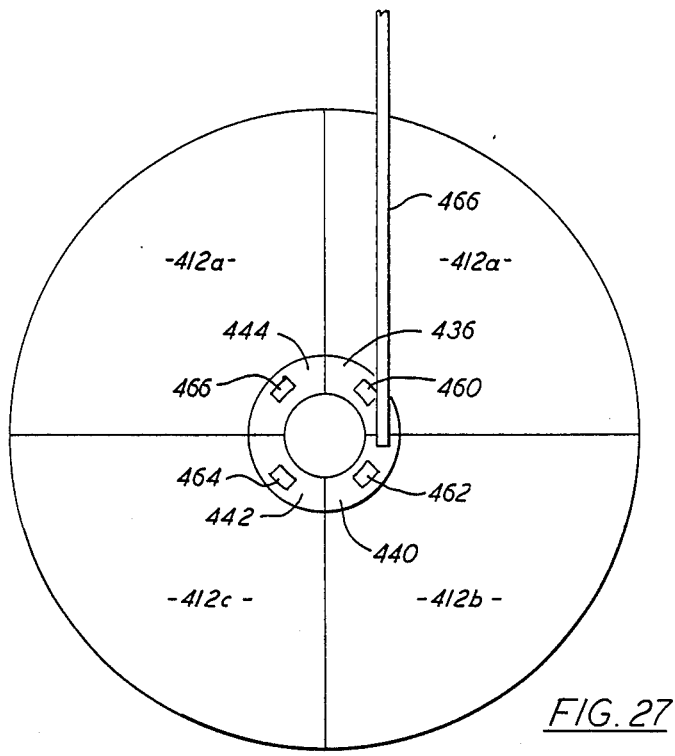
Figure 28:
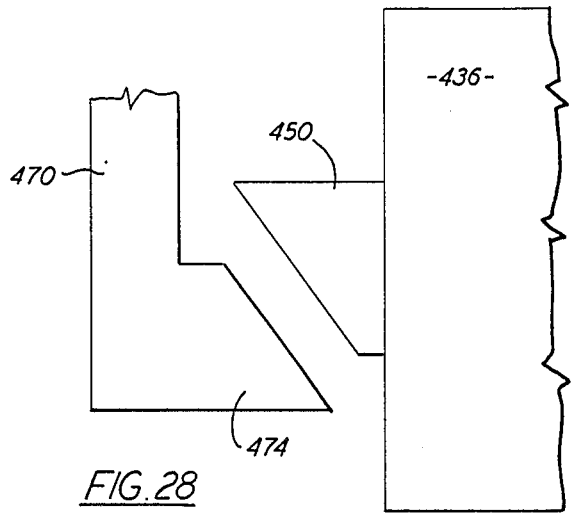
FIG. 28 is a partial elevated view showing detailes of the assembly of FIG. 25.

Preferably, the upshift cams axially project outward of pulley cluster 446 on a first axial side of the cluster of pulleys, and upshift arm 470 is located on this first axial side of the pulley cluster and is supported for sliding movement toward and away from the upshift cams. Similarly, the downshift cams axially project outward of pulley cluster 446 on a second axial side thereof, and downshift arm 472 is located on the second axial side of the pulley cluster and is supported for sliding movement toward and away from the downshift cams. With reference to FIGS. 25 and 27, preferably upshift and downshift arms 470, 472 each comprises a main portion and a finger 474, 476 extending axially inward from the main portion of the arm toward either the upshift or downshift cams; and contact between upshift arm 470 and the upshift cams is made by finger 474, while contact between downshift arm 472 and the downshift cams is made by finger 476. With particular reference to FIG. 28, these fingers 474, 476 and the upshift and downshift cams may include slanted end surfaces to facilitate sliding the cams along those fingers.

Actuator means 410, analogous to actuator means 110 of assembly 100, is connected to shift sub-assembly 406 to move that assembly from the disengaged position to the engaged position. More specifically, actuator means 410 includes means to move the upshift and downshift arms toward and away from the upshift and downshift cams, first, to move the upshift arm, and thus shift sub-assembly 406, between the disengaged and upshift positions, and second, to move the downshift arm, and thus the shift sub-assembly, between the disengaged and downshift positions.

Various specific means may be employed to do this; and with the embodiment of the invention shown in FIG. 25, actuator means 410 comprises shift bar 480. Bar 480 is located outside pulley sub-assembly 404, and extends parallel to axle 402; and the shift bar is supported by a pair of spaced support arms 482 and 484 for sliding movement along the axis of the shift bar. Shift arms 470 and 472 are connected to shift bar 480, and shift sub-assembly 406 is moved between the disengaged and engaged positions simply by sliding the shift bar to move the upshift and downshift arms into and out of the paths of movement of the upshift and downshift cams. A handle 486 may be connected to the shift bar to help slide that bar. Support arms may also support axle 402, although shift sub-assembly 406 and the axle may be supported for separate means. Also, suitable bearings (not shown) may be mounted on or in support arms 482 and 484 to facilitate sliding shift bar 480 and rotating axle 402 relative to those support arms.

FIG. 25 also shows a pulley 490 spaced from assembly 400, and a belt 492 drivingly mounted on that pulley 490 and one of the pulleys of assembly 400. Pulley 490 may either drive or be driven by assembly 400 via belt 492. FIG. 26 shows belt 492 mounted on pulley 422 and the point where this belt moves into the circumference of this pulley is identified as point "A," and the point where the belt moves out of the circumference of pulley 422 is identified as point "B" in FIG. 26. The arc between points "A" and "B" along the outside edge of pulley 422 defines a clearance arc where the pulley does not directly engage belt 492, and the radial lines extending between the center of pulley 422 and points "A" and "B" define a clearance wedge or area 494. With particular reference to FIGS. 26 and 27, shift arms 470 and 472 are located so that they engage the upshift and downshift cams of the pulley mounting sectors 436, 440, 442 and 444 when those sectors are in clearance area 494, and this eliminates any need to provide assembly 400 with means analogous to shift initiation cams 150 and 152 of assembly 100.

The operation of pulley shift assembly 400 to move a belt from one pulley the next smallest pulley will now be briefly summarized principally with reference to FIGS. 25 and 26. To start the shifting process, shift bar 480 is slid to the left, so that finger 474 moves into the path of the upshift cams. The next upshift cam that moves past finger 474 contacts and is pushed to the left by that finger a distance equal to the pulley pitch distance. The pulley mounting sector connected to that upshift cam, and all of the pulley sections connected to this pulley mounting sector, are also moved to the left that pulley pitch distance; and, in particular, a first section of pulley 424 is moved into the plane of pulley 422. This movement of the first section of pulley 422 is completed while that pulley section is inside clearance area 294; and, as pulley sub-assembly 404 continues to rotate around axle 402, belt 492 is engaged by and becomes mounted on that first pulley section of pulley 422.

As subsequent upshift cams move past finger 474, those cams, one by one, contact and are pushed to the left by finger 474 the pulley pitch distance. As a result, subsequent pulley mounting sectors are pushed, one by one, to the left the pulley pitch distance. As each pulley mounting sector is pushed to the left, all of the pulley sections mounted on that mounting sector are also moved to the left; and, in particular, second, third, and fourth sections of pulley 424 are moved one by one into the original plane of pulley 422. This movement of each pulley mounting sector, and of the pulley sections mounted thereon, is completed while those pulley sections are inside clearance area 494; and, as pulley sub-assembly 404 continues to rotate around axle 402, belt 492 is successively engaged by and becomes mounted on second, third and fourth sections of pulley 424.

During this shifting process, it is not necessary to move any particular pulley section first; and when the shifting process is complete, each pulley has been reformed in the original plain of the next largest pulley, and belt 492 itself does not move axially.

A tensioning mechanism, similar to mechanism 300, may be used with apparatus 400. However, since belt 492 does not move axially as it is shifted from one pulley to another of assembly 400, any tensioning mechanism used with this assembly may be held in a fixed axial location, and, in fact, it may be preferable to do this.

Assembly 400 is simpler than assembly 100 in many respects; and, in particular, the former assembly does not require the same type of shift cam, or the return or shift initiation cams of the latter assembly. However, assembly 100 is more compact than assembly 400 and may be better suited for applications, such as on bicycle, where axial space may be relatively limited.

While it is apparent that the invention disclosed herein is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A pulley shift assembly, comprising:
   an elongated axle defining an axis of the assembly;
   a pulley sub-assembly mounted on the axle for rotation about the axis, and including a plurality of pulleys, each pulley including a plurality of sections, at least a first section of each pulley being axially movable relative to a second section of the pulley, the pulleys having a normal position wherein all of the sections of each pulley are coplanar, the pulleys are axially spaced apart a preset distance, and each pulley defines a respective pulley plane;
   a shift sub-assembly located adjacent the pulley sub-assembly, and including
   (i) shifting means having a disengaged position for maintaining the pulleys in the normal position, and an engaged position to slide at least the first section of each pulley the preset distance along the axle from the respective plane of the pulley and into an adjacent parallel plane, and
   (ii) return means to automatically return at least the first section of each pulley to the respective plane thereof in response to shifting said first section into said adjacent, parallel plane; and
   actuator means connected to the shift sub-assembly to move the shifting means from the disengaged position to the engaged position.

2. A pulley shift assembly according to claim 1, wherein:
   the pulley sub-assembly further includes pulley mounting means mounted on the axle for rotation about the axis; and
   the pulleys are connected to the mounting means for rotation therewith.

3. A sprocket shift assembly according to claim 2, wherein the pulley mounting means includes:
   a drive hub mounted on the axle, and
   a plurality of pulley mounting sectors connected to the drive hub for rotation therewith, at least a first pulley mounting sector being supported for axial sliding movement along the drive hub.

4. A pulley shift assembly according to claim 3, wherein different sections of each pulley are connected to different pulley mounting sectors.

5. A pulley shift assembly according to claim 4, wherein:
   the drive hub includes
   (i) a cylindrical body, and
   (ii) a pair of spaced flanges radially extending outward from the cylindrical body; and
   each pulley mounting sector is located radially outside the cylindrical body of the drive hub, axially between the spaced flanges thereof.

6. A pulley shift assembly according to claim 5, for use with a wheel hub rotatably mounted on the axle, and wherein the pulley mounting means further includes means connected to the drive hub to transmit rotary movement to the wheel hub from the drive hub.

7. A pulley shift assembly according to claim 2, wherein:
the engaged position of the shifting means includes
(i) an up-shift position to slide at least the first pulley section of the first pulley into the plane of the second pulley, and then back again into the plane of the first pulley, and
(ii) a down-shift position to slide at least the first pulley section of the second pulley into the plane of the first pulley, and then back again into the plane of the second pulley; and
the actuator means includes means to move the shift sub-assembly between the disengaged position and the up-shift position, and between the disengaged position and the down-shift position.

8. A pulley shift assembly according to claim 1, wherein:
the shifting means is mounted on the axle for axial sliding movement thereablong between said engaged and disengaged positions; and
the actuator means is adapted to slide the shifting means from the disengaged position to the engaged position.

9. A pulley shift assembly according to claim 8, wherein the return means is mounted on the axle, in a fixed position along the axis thereof.

10. A pulley shift assembly according to claim 1, wherein:
at least a plurality of sections of each pulley are axially movable relative to said second section of the pulley; and
in the engaged position, the shifting means slides at least first and second of the axially movable sections of at least a first pulley, one at a time, from the plane thereof, into the plane of a second, adjacent pulley, and the return means then slides at least the first and second of the axially movable sections of the first pulley together from the plane of the second pulley back into the plane of the first pulley.

11. A pulley shift assembly, comprising:
an elongated axle defining an axis of the assembly;
a pulley sub-assembly, including
(i) a drive hub mounted on the axle for rotation about the axis,
(ii) a plurality of pulley mounting sectors connected to the drive hub for rotation therewith, at least a first pulley mounting sector being supported for axial sliding movement along the drive hub, and
(iii) a plurality of pulleys, each pulley including a plurality of sections, a first section of each pulley being connected to the first pulley mounting sector for axial and rotary movement therewith, the pulleys having a normal position wherein all of the sections of each pulley are co-planar and the pulleys are axially spaced apart a preset distance,
wherein the first pulley mounting sector includes a shift peg extending radially inward through the drive hub, and when the pulleys are in their normal position, the shift peg rotates around the axis in a normal path;
a shift sub-assembly located adjacent the pulley sub-assembly and including
(i) shifting means having a disengaged position to maintain the pulleys in the normal position, and an engaged position to engage the shift peg and to slide the shift peg the preset distance along the axle to thereby move at least the first section of each pulley from the plane thereof into an adjacent parallel plane, and
(ii) return means to return at least the first section of each pulley to the plane thereof from the adjacent parallel plane; and
actuator means connected to the shift sub-assembly to move the shifting means from the disengaged position to the engaged position.

12. A pulley assembly according to claim 11, wherein:
the normal path of the shift peg comprises a first circumferential path around the axle;
the shifting means includes a shift cam;
the engaged position includes
(i) an up-shift position to move the peg from the first circumferential path around the axle to move the first pulley section of the first pulley from the plane thereof, into the plane of a second pulley, and
(ii) a down-shift position to move the peg from the first circumferential path to a third circumferential path around the axle to move the first pulley section of the second pulley from the plane thereof into the plane of the first pulley; and
the return means includes a return cam to return the peg from the second circumferential path to the first circumferential path and thereby to return the first section of the first pulley into the plane thereof, and to return the peg from the third circumferential path to the first circumferential path and to thereby return the first section of the second pulley into the plane thereof.

13. A pulley shift assembly according to claim 12, wherein the pulley sub-assembly further includes means to return the shift cam from the upshift position to the disengaged position, and from the downshift position to the disengaged position.

14. A pulley shift assembly according to claim 12, wherein:
the shift cam includes an up-shift tab, and a down-shift tab;
the shift cam is mounted on the axle for sliding movement therealong;
when the shift cam is in the up-shift position, the up-shift tab is located in the first circumferential path of the peg to guide the peg therefrom into the second circumferential path; and
when the shift cam is in the down-shift position, the downshift tab is located in the first circumferential path to guide the peg therefrom into the third circumferential path.

15. A pulley shift assembly according to claim 14, wherein the return cam includes:
a first stepped section circumferentially aligned with the second circumferential path, and including a shoulder to guide the peg to the first circumferential path from the second circumferential path; and
a second stepped section circumferentially aligned with the third circumferential path, and including a shoulder to guide the peg to the first circumferential path from the third circumferential path.

16. A pulley shift assembly according to claim 12, wherein the actuator means includes means to move the shift cam from the disengaged position to the up-shift position, and from the disengaged position to the down-shift position.

17. A pulley shift assembly according to claim 12 wherein:
the shift sub-assembly further includes first and second shift initiation cams connected to the sprocket sub-assembly for rotation therewith and radially extending adjacent to the shift cam;
the first shift initiation cam includes an inside circumferential edge, and a recess radially extending outward therefrom to allow the shift cam to slide from the disengaged position to the up-shift position when the first pulley section is in a predetermined area of the plane of the first pulley; and
the second shift initiation cam includes an inside circumferential edge, and a recess radially extending outward therefrom to allow the shift cam to slide from the disengaged position to the down-shift position when the first pulley section is in the predetermined area of the plane of the first pulley.

18. A pulley shift assembly according to claim 17, wherein the pulley sub-assembly further includes:
a first return tab connected to the first shaft initiation cam for rotation therewith, to engage the down-shift tab when the shift cam is in the upshift position and push the shift cam from the up-shift position to the disengaged position; and
a second return tab connected to the second shift initiation cam for rotation therewith, to engage the up-shift tab when the shift cam is in the down-shift position and push the shift cam from the down-shift position to the disengaged position.

19. A pulley shift assembly according to claim 12, wherein:
the axle includes an end socket, and a radial opening in communication with the socket;
the actuator means includes
 (i) a pin connected to the shift cam to move the shift cam axially, the pin radially extending inward through the radial opening and into the end socket of the axle, and
 (ii) means supported for axial movement in the end socket, and connected to the pin for moving said pin axially.

20. A sprocket shift assembly according to claim 19, wherein the means for moving the pin includes:
a base member located in the end socket and mounted on the pin;
a rod supported in the end socket for sliding movement therein toward and away from the base member; and
a spring connected to and extending between the rod and the base member to transmit forces thereto from the rod.

21. A pulley shift asssembly, comprising:
an elongated axle defining an axis of the assembly;
a pulley sub-assembly, including
 (i) a plurality of pulley mounting sectors mounted on the axle for rotation about the axis, and supported for axial sliding movement along the axle, each pulley mounting sector including an upshift cam and a downshift cam,
 (ii) a plurality of pulleys, each pulley including a plurality of sections, a first section of each pulley being connected to a first pulley mounting sector for axial and rotary movement therewith, and a second section of each pulley being connected to a second pulley mounting sector for axial and rotary movement therewith, the pulleys having a normal position wherein all of the sections of each pulley are co-planar and the pulleys are axially spaced apart a preset distance;
a shift sub-assembly located adjacent the pulley sub-assembly, and having a disengaged position for maintaining the pulleys in the normal position, and an engaged position to slide the first section of each pulley the preset distance along the axle and then to slide the second section of each pulley the preset distance along the axle, the engaged position of the shift sub-assembly including
 (i) an up-shift position to engage the upshift cam of each pulley mounting sector to slide the pulley mounting sectors one at a time the preset distance in a first axial direction along the axis, and
 (ii) a down-shift position to engage the downshift cam of each pulley mounting sector to slide the pulley mounting sectors one at a time the preset distance in a second axial direction along the axis; and
actuator means connected to the shift sub-assembly to move the shift sub-assembly from the disengaged position to the engaged position.

22. A pulley shift assembly according to claim 21, wherein:
the upshift cams are supported for movement in a first circumferential path around the axis;
the downshift cams are supported for movement in a second circumferential path around the axis;
the shift sub-assembly includes an upshift arm and a downshift arm;
when the shift sub-assembly is in the upshift position, the upshift arm extends into the first path of movement to engage the upshift cams one at a time and slide the pulley mounting sectors in the first axial direction;
when the shift sub-assembly is in the downshift position, the downshift arm extends into the second path of movement to engage the downshift cams one at a time and slide the pulley mounting sectors in the second axial direction; and
the actuator means includes means to move the upshift arm into and out of the first path of movement and to move the downshift arm into and out of the second path of movement.

23. A pulley shift assembly according to claim 22, wherein:
the pulleys are arranged in a cluster;
the downshift cam of each pulley mounting sector axially projects outward of the cluster, on a first axial side thereof;
the upshift cam of each pulley mounting sector axially projects outward of the cluster, on a second axial side thereof;
the downshift arm is located on the first axial side of the cluster of sprockets, and is supported for sliding movement toward and away from the downshift cams; and
the upshift arm is located on the second axial side of the cluster of the sprockets, and is supported for sliding movement toward and away from the upshift cams.

24. A pulley shift assembly, comprising:
an elongated axle defining an axis of the assembly;
a pulley sub-assembly including (i) pulley mounting means rotatably mounted on the axle, (ii) a plurality of pulleys connected to the pulley mounting means for rotation therewith, each pulley including first, second, third and fourth sections, and having a normal position wherein all of the sections of the pulley are co-planar and define a pulley plane, wherein the first, second, third and fourth sections of each pulley are axialy aligned respectively with the first, second, third and fourth sections of the other pulleys; and wherein the first, second, and third sections of each pulley are axially moveable relative to the fourth section of the pulley; and a shift sub-assembly mounted on the axle and having (i) a disengaged position to maintain the pulleys in their normal positions, (ii) an up-shift position to slide the first, second, and third sections of a first pulley one at a time from the plane of the first pulley into the plane of a second, adjacent pulley, and then to slide the first, second and third sections of the first pulley together from the plane of the second pulley back into the plane of the first pulley, and (iii) a down-shift position to slide the first, second and third sections of the second pulley one at a time from the plane thereof into the plane of the first pulley, and then to slide the first, second and third sections of the second pulley together from the plane of the first pulley back into the plane of the second pulley; and actuator means connected to the shift sub-assembly to move the shift assembly from the disengaged position to the up-shift position, and from the disengaged position to the down-shift position.

25. A pulley shift assembly according to claim 24, wherein:

the pulley mounting means includes (i) a drive hub rotatably mounted on the axle, (ii) first, second and third pulley mounting sectors connected to the drive hub for rotation therewith, and supported for axial sliding movement along the drive hub, and (iii) a fourth pulley mounting sector connected to the drive hub for rotary movement therewith; and the first, second, third and fourth sections of each pulley are respectfully connected to the first, second, third and fourth pulley mounting sectors for rotary and axial movement therewith.

26. An assembly according to claim 25, wherein:

the first, second and third pulley mounting sectors respectively include first, second and third shift pegs extending radially inward through the drive hub;

when the pulleys are in their normal positions, the first, second and third shift pegs are located in a first circumferential path around the axle;

the shift assembly includes a shift cam having (i) an up-shift position to move the first, second and third shift pegs one at a time from the first circumferential path to a second circumferential path around the axle to move the first, second and third sections of the first pulley one at a time from the plane thereof into the plane of the second pulley, and (ii) a down-shift position to move the first, second and third shift pegs one at a time from the first circumferential path to a third circumferential path around the axle to move the first, second and third sections of the second pulley one at a time from the plane thereof into the plane of the first pulley; and the shift sub-assembly further includes a return cam to return the first, second and third shift pegs together from the second circumferential path to the first circumferential path to thereby return the first, second and third sections of the first pulley together into the plane thereof; and to return the first, second and third shift pegs together from the third circumferential path to the first circumferential path to thereby return the first, second and third sections of the second pulley together into the plane thereof.

27. A pulley shift assembly according to claim 26, wherein the return cam includes:

a first stepped section circumferentially aligned with the second circumferential path, and including first, second, and third shoulders respectively to guide the first, second and third shift pegs to the first circumferential path from the second circumferential path; and a second stepped section circumferentially aligned with the third circumferential path, and including fourth, fifth and sixth shoulders respectively to guide the first, second and third shift pegs to the first circumferential path from the third circumferential path.

28. A pulley shift assembly according to claim 27, wherein:

the shift sub-assembly further includes first and second shift initiation cams connected to the pulley sub-assembly for rotation therewith, and extending adjacent the shift cam;

the first shift initiation cam includes an inside circumferential edge, and a recess radially extending outward therefrom to allow the shift cam to slide from the disengaged position to the up-shift position when the first section of the first pulley is in a predetermined area of the plane of the first pulley; and the second shift initiation cam includes an inside circumferential edge, and a recess radially extending outward therefrom to allow the shift cam to slide from the disengaged position to the down-shift position when the first section of the second pulley is in a predetermined area of the plane of the second pulley.

29. A bicycle, comprising a frame;

a seat connected to the frame to support a rider;

front and back axles supported by the frame and defining front and back axes respectively;

a front wheel mounted on the front axle for rotation about the front axis;

a back wheel mounted on the back axle for rotation about the back axis;

a drive sprocket rotatably supported by the frame;

left and right crank arms connected to the drive sprocket for rotation therewith;

left and right pedals connected to the left and right crank arms, respectively, to rotate the crank arms and the drive sprocket;

a sprocket sub-assembly mounted on the back axle for rotation about the back axis, and including a plurality of sprockets, each sprocket including a multitude of sections, at least a plurality of sections of each sprocket being axially movable relative to a selected section of the sprocket, the sprockets having a normal position wherein all of the sections of each sprocket are co-planar and the sprockets are axially spaced apart a preset distance;

a drive chain mounted on the drive sprocket and on one of the sprockets of the sprocket sub-assembly to rotate said sprocket sub-assembly with the drive sprocket;

means connected to the sprocket sub-assembly and to the back wheel to transmit rotary movement thereto from the sprocket sub-assembly;

a shift sub-assembly mounted on the back axle, and having a disengaged position for maintaining the sprockets in the normal position, and an engaged position to slide at least first and second of the axially movable sections of at least a first sprocket, one at a time, from the plane thereof, into the plane of a second, adjacent sprocket, and then to slide at least said first and second of the axially movable sections of the first sprocket together from the plane of the second sprocket back into the plane of the first sprocket to shift the drive chain from said second sprocket to said first sprocket; and actuator means connected to the shift sub-assembly to move the shift sub-assembly from the disengaged position to the engaged position.

30. A bicycle according to claim 29, wherein:
the sprocket sub-assembly further includes
(i) a drive hub mounted on the back axle, and
(ii) a plurality of sprocket mounting sectors connected to the drive hub for rotation therewith, at least a first sprocket mounting sector being supported for axial sliding movement along the drive hub; and
different sections of each sprocket are connected to different sprocket mounting sectors.

31. A bicycle according to claim 30, wherein:
the first section of each sprocket is connected to the first sprocket mounting sector for axial and rotary movement therewith;
the first sprocket mounting sector includes a peg extending radially inward through the drive hub;
when the sprockets are in their normal position, the peg rotates around the back axle in a first circumferential path;
the shift sub-assembly includes a shift cam having
(i) a disengaged position to maintain the sprockets in the normal position,
(ii) an up-shift position to move the peg from the first circumferential path to a second circumferential path around the back axle to move the first sprocket section of the first sprocket from the plane thereof, into the plane of the second sprocket, and
(iii) a down-shift position to move the peg from the first circumferential path to a third circumferential path around the back axle to move the first sprocket section of the second sprocket from the plane thereof into the plane of the first sprocket;
the shift sub-assembly further includes a return cam to return the peg from the second circumferential path to the first circumferential path and thereby to return the first section of the first sprocket into the plane thereof, and to return the peg from the third circumferential path to the first circumferential path and to thereby return the first section of the second sprocket into the plane thereof; and
the actuator means includes means to move the shift cam between the disengaged position and the up-shift position, and between the disengaged position and the down-shift position.

32. A bicycle according to claim 31, wherein the return cam includes:
a first stepped section circumferentially aligned with the second circumferential path, and including a shoulder to guide the peg to the first circumferential path from the second circumferential path; and
a second stepped section circumferentially aligned with the third circumferential path, and including a shoulder to guide the peg to the first circumferential path from the third circumferential path.

33. A bicycle assembly according to claim 32, wherein:
the shift sub-assembly further includes first and second shift initiation cams connected to the sprocket sub-assembly for rotation therewith and radially extending adjacent to the shift cam;
the first shift initiation cam includes an inside circumferential edge, and a recess radially extending outward therefrom to allow the shift cam to move from the disengaged position to the up-shift position when the first section of the first sprocket is in a predetermined area of the plane thereof;
the second shift initiation cam includes an inside circumferential edge, and a recess radially extending outward therefrom to allow the shift cam to move from the disengaged position to the down-shift position when the first section of the first sprocket is in the predetermined area of the plane thereof; and
the pulley sub-assembly further includes
(i) a first return tab connected to the first shift initiation cam for rotation therewith, to engage the shift cam when the shift cam is in the upshift position, and to push the shift cam from the up-shift position to the disengaged position, and
(ii) a second return tab connected to the second shift initiation cam for rotation therewith, to engage the shift cam when the shift cam is in the down-shift position, and to push the shift cam from the down-shift position to the disengaged position.

* * * * *